United States Patent
Eleftheriadis et al.

(10) Patent No.: US 12,273,748 B2
(45) Date of Patent: Apr. 8, 2025

(54) MONITORING THE PERFORMANCE OF A PLURALITY OF NETWORK NODES

(71) Applicant: Telefonaktiebolaget LM Ericsson (publ), Stockholm (SE)

(72) Inventors: Lackis Eleftheriadis, Valbo (SE); Yifei Jin, Solna (SE); Jawwad Ahmed, Kista (SE); Athanasios Karapantelakis, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 343 days.

(21) Appl. No.: 17/765,531

(22) PCT Filed: Oct. 3, 2019

(86) PCT No.: PCT/EP2019/076850
§ 371 (c)(1),
(2) Date: Mar. 31, 2022

(87) PCT Pub. No.: WO2021/063514
PCT Pub. Date: Apr. 8, 2021

(65) Prior Publication Data
US 2022/0400394 A1 Dec. 15, 2022

(51) Int. Cl.
*H04W 24/04* (2009.01)
*H04L 41/14* (2022.01)
(Continued)

(52) U.S. Cl.
CPC .......... *H04W 24/04* (2013.01); *H04L 41/142* (2013.01); *H04L 41/145* (2013.01); *H04L 41/16* (2013.01); *H04L 43/08* (2013.01); *H04L 43/16* (2013.01)

(58) Field of Classification Search
None
See application file for complete search history.

(56) References Cited

U.S. PATENT DOCUMENTS

| 9,900,790 B1* | 2/2018 | Sheen ................ G06N 5/04 |
| 2015/0135012 A1 | 5/2015 | Bhalla et al. |

(Continued)

OTHER PUBLICATIONS

3GPP, "3GPP TS 32.404 V15.0.0", 3rd Generation Partnership Project; Technical Specification Group Services and System Aspects; Telecommunication management; Performance Management (PM); Performance measurements; Definitions and template (Release 15), Jun. 2018, 1-34.

(Continued)

*Primary Examiner* — Adolf Dsouza
(74) *Attorney, Agent, or Firm* — Murphy, Bilak & Homiller, PLLC

(57) ABSTRACT

A computer-implemented method and apparatus obtain a plurality of data sets. A data set comprises a respective value of a performance metric for each of a plurality of network nodes interconnected in a multi-hop arrangement. Each of the plurality of data sets is classified as normal or abnormal by comparing the respective values of the performance metric of each of the plurality of network nodes to a corresponding normality threshold, thus providing a plurality of classified data sets. The plurality of classified data sets is processed using a machine-learning algorithm in order to derive, for at least one network node of the plurality of network nodes, a node performance assessment threshold indicative of a value of the performance metric of the at least one node at which the plurality of network nodes has a predetermined likelihood of being classified as normal.

19 Claims, 8 Drawing Sheets

(51) Int. Cl.
*H04L 41/142* (2022.01)
*H04L 41/16* (2022.01)
*H04L 43/08* (2022.01)
*H04L 43/16* (2022.01)

(56) References Cited

U.S. PATENT DOCUMENTS

| | | | |
|---|---|---|---|
| 2015/0333998 | A1 | 11/2015 | Gopalakrishnan et al. |
| 2017/0207981 | A1 | 7/2017 | Maguire et al. |
| 2018/0219754 | A1* | 8/2018 | Udupi ............... H04L 41/16 |
| 2018/0285320 | A1* | 10/2018 | Yang ............... G06N 5/045 |
| 2020/0076707 | A1* | 3/2020 | Dukic ............... H04L 41/5009 |
| 2020/0233724 | A1* | 7/2020 | Schmidt ............ G06F 11/3466 |
| 2020/0252812 | A1* | 8/2020 | Soundrarajan ......... H04L 41/16 |
| 2021/0368481 | A1* | 11/2021 | Jo ................. H04W 72/21 |

OTHER PUBLICATIONS

3GPP, "3GPP TS 32.450 V15.2.0", 3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 15), Sep. 2019, 1-16.

3GPP, "3GPP TS 32.451 V16.0.0", 3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 16), Sep. 2019, 1-13.

3GPP, "3GPP TS 36.216 V10.3.1", 3rd Generation Partnership Project; Technical Specification Group Radio Access Network; Evolved Universal Terrestrial Radio Access (E-UTRA); Physical layer for relaying operation (Release 10), Sep. 2011, 1-16.

3GPP, "ETSI TS 122 071 V11.0.0", Digital cellular telecommunications system (Phase 2+); Universal Mobile Telecommunications System (UMTS); LTE; Location Services (LCS); Service description; Stage 1 (3GPP TS 22.071 version 11.0.0 Release 11), Oct. 2012, 1-51.

Qualcomm, "Revised WID: Integrated Access and Backhaul for NR", 3GPP TSG RAN meeting #83, RP-190712, Shenzhen, China, Mar. 18-21, 2019, 1-7.

3GPP, "3GPP TR 36.806 V9.0.0", 3rd Generation Partnership Project; Technical Specification Group Radio Access Network; Evolved Universal Terrestrial Radio Access (E-UTRA); Relay architectures for E-UTRA (LTE-Advanced) (Release 9), 3rd Generation Partnership Project, Mar. 2010, pp. 1-34.

Author Unknown, "Multitier architecture", Wikipedia, XP093168132, <http://en.wikipedia.org/w/index.php?title=Multitier_architecture&oldid=904835974>, Jul. 4, 2019, 1-5.

* cited by examiner

MONITORING THE PERFORMANCE OF A PLURALITY OF NETWORK NODES

TECHNICAL FIELD

The present invention generally relates to the field of performance monitoring for network nodes. In particular, the present invention is directed to an apparatus and a computer-implemented method for monitoring the performance of a plurality of network nodes using at least one node performance assessment thresholds.

BACKGROUND

Contemporary telecommunications networks, such as telephone networks (e.g. long term evolution, LTE, and $5^{th}$ Generation, 5G, mobile networks and other cellular networks), computer networks and the Internet, etc. continue to increase in complexity in terms of the number of connected nodes and the volume of data traffic and control traffic transmitted between nodes of the network. This results not only in an increase in interactions (e.g. transmission and reception) between connected nodes but also in a higher processing load on the individual nodes themselves as they are required to process ever increasing volumes of control information and user data.

In order to cope with this increase in traffic and processing load in contemporary networks, numerous technologies have been adopted. By way of example, with regard to cellular networks, LTE release 10 (3GPP TS 36.216 V10.3.1 (2011-09) introduced support for relay nodes, i.e. low power base stations that provide enhanced coverage and capacity at cell edges, and hot-spot areas. A relay node is connected to the donor eNB (DeNB) via a radio interface and the relay node is able to communicate with a core network via the donor node. Such relay nodes were introduced in order to allow more efficient heterogeneous network planning.

By way of further example, in future radio communication systems such as 5G mobile networks of release 15 or after, it is considered to provide support for wireless backhaul and relay links between radio base stations in order to enable flexible and very dense deployment of cells without the need for proportionately increasing the density of the wired transport network. In such systems, referred to as integrated access and backhaul (IAB), an IAB donor node provides access to the core network (backhaul) to one or more IAB relay nodes.

Such technologies have further contributed to the interconnectivity between nodes.

For any type of telecommunications network, monitoring performance, including detecting abnormal behavior in a node, is of prime importance. Abnormal behavior or abnormality may refer to any condition in a node that indicates that the node is not functioning correctly or optimally. This may be the case where a node is unable to perform a function (at all or in a required manner) or that the node risks or is experiencing damage or failure. This requirement to detect abnormal behavior is especially critical for nodes in networks that are configured to provide real-time, low-latency, guaranteed throughput applications (such as, for example, ultra-reliable low latency communications, URLLC, in 5G networks).

In contemporary networks, the performance of a node is typically monitored by determining one or more performance metrics of the node and comparing these metrics to reference values or thresholds. Depending on the performance metric question, the value of the performance metric exceeding or falling below the reference value or threshold may be taken to be indicative of abnormal behavior in the node. Such performance metrics may be determined using, for example, measurement data of the node or data output by the node and may consist of a single, directly measured value (e.g. an output voltage) or may instead comprise a mathematic relation of data from different sources relating to the node.

By way of example, in contemporary mobile networks, multiple performance management (PM) counters (for example, number of connected users, total bandwidth consumed, total power consumption) may be recorded in respect of each node and key performance indicators (KPIs) may be determined using the values of the PM counters (3GPP TS 32.404: "Telecommunication management; Performance Management (PM); Performance measurements—Definitions and template"; 3GPP TS 32.450: "Telecommunication management; Key Performance Indicators KPI) for Evolved Universal Terrestrial Radio Access Network (E-UTRAN): Definitions"; 3GPP TS 32.451 "Telecommunication management; Key Performance Indicators (KPI) for Evolved Universal Terrestrial Radio Access Network (E-UTRAN); Requirements"). The values of the PM counters and KPIs at a particular time may then be used to evaluate how well a node is performing and whether the node is exhibiting abnormal behavior at that time, for example, by comparison to a threshold or reference value as discussed above. In a similar manner, suitable key performance indicators and other performance metrics may be defined for any type of telecommunications network.

In general, monitoring the performance of even a single node is a complicated task given the variable demands and traffic patterns of current and future mobile networks and the variety of metrics by which performance may be assessed.

SUMMARY OF THE INVENTION

Technical Problem

Conventionally, performance monitoring of a network node is reactive. That is, an action (e.g. such as outputting an alert or alarm to a network operator) is taken upon or after it is determined that the node is behaving abnormally. By way of example, a performance monitoring system in conventional networks may perform machine learning (ML)-based time series analysis or other methods on data provided from the network's IT infrastructure in order to detect whether abnormal behavior has occurred in the nodes of the network, abnormal behaviour being defined based on performance metrics and their associated thresholds or reference values.

In a case where such analysis indicates that abnormal behavior has occurred, the performance monitoring system responds to the detected abnormality, for example, by changing a configuration of a node determined to be behaving abnormally in order to improve the values of its performance metrics. Over time, a performance monitoring system having machine-learning algorithm may finetune the thresholds and reference values associated with various performance metrics.

The present inventors have recognized that a number of problems exist with such conventional performance monitoring systems, especially in view of nodes interconnected in a multi-hop arrangement, e.g. relay and self-backhaul.

Firstly, conventional systems, such as those described above, are generally unable to detect, in advance, that nodes are tending towards abnormal behaviour, e.g. the values of one or more performance metrics of a node are degrading (moving towards their associated threshold or reference value). Instead, such systems only facilitate detection that nodes are currently behaving abnormally when, for example, the values of one or more performance metrics of that node have exceeded or fallen below their respective thresholds, at which point an alarm or alert is output. In particular, performance monitoring systems with machine-learning algorithm s are usually trained using previously collected empirical data, including data indicating whether or not an alarm or alert was raised for a particular node at any given time. The machine-learning algorithms learn to classify empirical data of a node at a particular time as indicating normal or abnormal performance based on whether an alarm or alert was raised at that time. Thus, such performance monitoring system having machine-learning algorithms are triggered by states in which a node is already behaving abnormally.

At the point at which an alarm or alert is output, the relevant network node may have already been performing abnormally for some time. As such, the abnormal behaviour of the node may have already negatively affected the movement of traffic through the network or the performance of other nodes. Furthermore, in some more extreme cases, the abnormal behaviour of a network node may have already resulted in damage to the hardware of the node if the abnormal behaviour resulted in overheating or excessive voltages or currents.

Furthermore, the present inventors have recognised that the existing performance metrics, such as, for example, the KPIs of LTE and 5G mobile networks which are based on PM counters, do not reflect how the values of the performance metrics of a node are correlated to each other. Furthermore, such existing performance metrics lack granularity in that their associated thresholds and reference values do not reflect this correlation so cannot provide any information on the particular combination of factors that resulted in a node's abnormal behaviour.

In addition, the present inventors have recognised that existing performance metrics, such as, for example, the KPIs of LTE and 5G mobile networks which are based on PM counters, do not reflect how the values of the performance metrics of a node are correlated to the values of the performance metrics of other connected nodes in the network. The ability to assess the performance of individual network nodes in light of the interdependence between connected nodes is particularly vital in, for example, mobile networks which use relay nodes and/or IAB, as discussed above, because performance issues may propagate between connected nodes in these cases.

Summary of the Solution

The present invention addresses the above technical problems.

In particular, in view of the limitations discussed above, the present inventors have devised, in accordance with a first example aspect herein, a computer-implemented method for of monitoring the performance of a plurality of network nodes interconnected in a multi-hop arrangement using at least one node performance assessment threshold. The method comprises obtaining a plurality of data sets. A data set comprises a respective value of a performance metric for each of the plurality of network nodes. Each of the plurality of data sets is classified as normal or abnormal by comparing the respective values of the performance metric of each of the plurality of network nodes to a corresponding normality threshold, thus providing a plurality of classified data sets. The plurality of classified data sets is processed using a machine-learning algorithm in order to derive, for at least one network node of the plurality of network nodes, a node performance assessment threshold indicative of a value of the performance metric of the at least one node at which the plurality of network nodes has a predetermined likelihood of being classified as normal.

The present inventors have further devised, in accordance with a second example aspect herein, a computer program which, when executed by a computer, causes the computer to perform the method according to the first example aspect herein.

The present inventors have further devised, in accordance with a third example aspect herein, a non-transitory computer-readable storage medium storing a computer program in accordance with the second aspect.

The present inventors have further devised, in accordance with a fourth example aspect herein, a signal carrying a computer program in accordance with the second aspect.

The present inventors have further devised, in accordance with the fifth example aspect herein, an apparatus for monitoring the performance of a plurality of network nodes interconnected in a multi-hop arrangement using at least one node performance assessment threshold. The apparatus comprises processing circuitry and a memory containing instructions executable by the processing circuitry. The apparatus is configured to obtain a plurality of data sets. A data set comprises a respective value of a performance metric for each of the plurality of network nodes. The apparatus furthermore is configured to classify each of the plurality of data sets as normal or abnormal by comparing the respective values of the performance metric of each of the plurality of network nodes to a corresponding normality threshold, thus providing a plurality of classified data sets. The apparatus also is able to process the plurality of classified data sets using a machine-learning algorithm in order to derive, for at least one network node of the plurality of network nodes, a node performance assessment threshold indicative of a value of the performance metric of the at least one node at which the plurality of network nodes has a predetermined likelihood of being classified as normal.

With the method, apparatus and program as described above, it becomes possible to monitor the interdependence between the plurality of nodes interconnected in the multi-hop arrangement, especially in view of assessing at what own performance threshold one node might lead to another node being classified as abnormal.

BRIEF DESCRIPTION OF THE DRAWINGS

Embodiments of the invention will now be explained in detail, by way of non-limiting example only, with reference to the accompanying figures, described below. Like reference numerals appearing in different ones of the figures can denote identical or functionally similar elements, unless indicated otherwise.

DETAILED DESCRIPTION

Figure 1A:
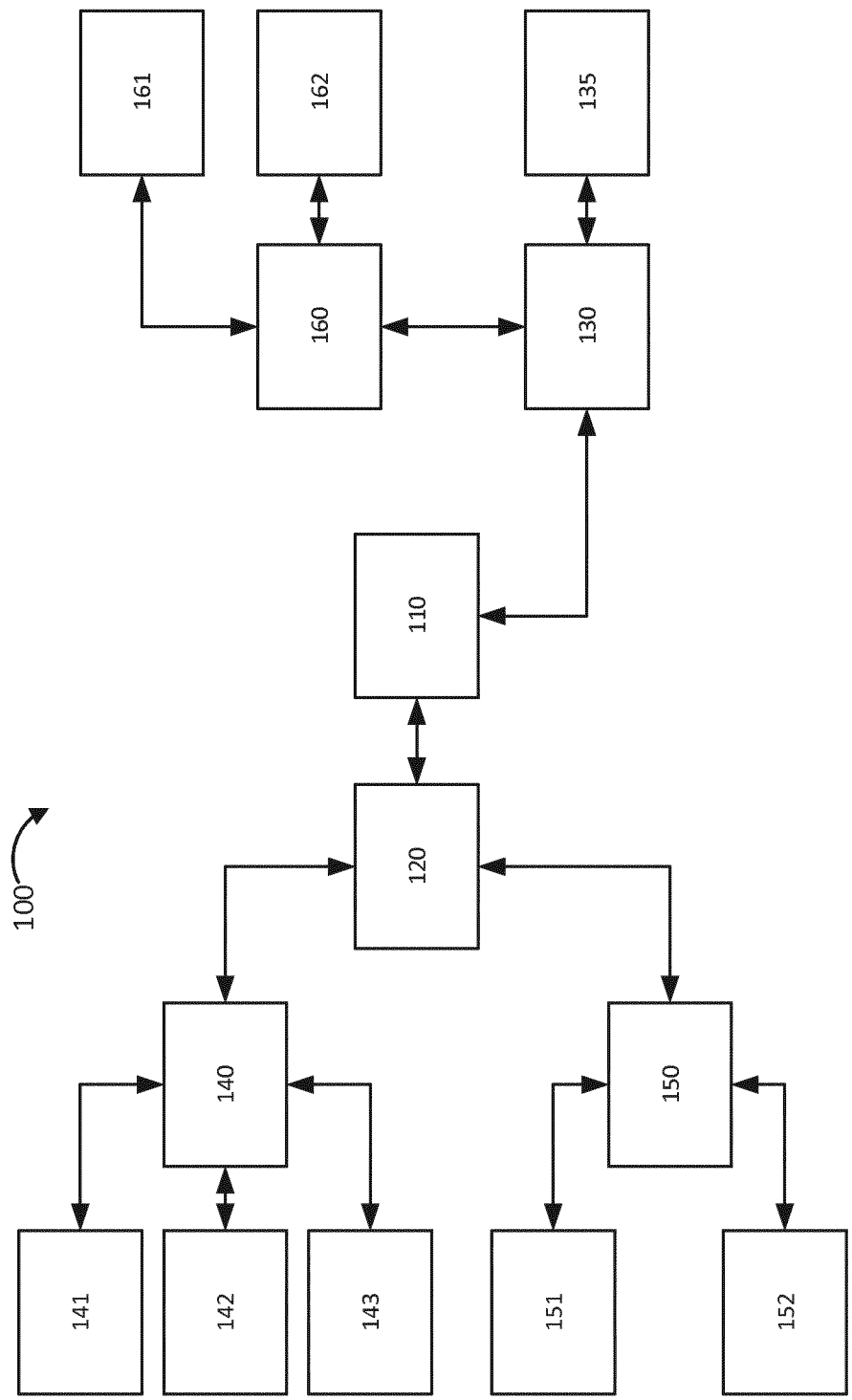
FIG. 1A is a schematic illustration showing a telecommunications network, according to an example aspect herein.

Example embodiments of the present invention will now be described in detail with reference to the accompanying drawings.

Where technical features in the drawings, detailed description or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

FIG. 1A is a schematic illustration showing a telecommunications network 100, according to an example aspect herein. The telecommunications network 100 may be any type of network, such as a telephone network, a computer network, the Internet, in which information is transmitted using a plurality of connected network nodes 110-162. In the example aspect of FIG. 1, the network 100 comprises 14 network nodes 110-162. Alternatively, in other example aspects, the network 100 may comprise any suitable number of nodes which may be connected in any way.

The plurality of network nodes 110-162 may include any set of nodes in the network 100 which are connected such that their performance is interdependent in some way. By way of example, a suitable plurality of nodes may comprise, any of the various network nodes defined in 3GPP standards (BS, BSS, eNB, gNB, MME, BBU, RRH), layer 3 switch (e.g. routers), layer 2 switches, wireless access points, Bluetooth devices, etc.

By way of example, in a first non-limiting exemplary aspect of the network 100, node 110 of network 100 may be the internet and nodes 120 and 120 may be an L3 switch, such as a router. Node 135 may be, for example, a server. In addition, each of nodes 140, 150 and 160 may be layer 2 switches or wireless access points. In the case where any one of nodes 140, 150 and 160 is a layer 2 switch, its respective connect nodes among nodes 141, 142, 143, 151, 152, 161, and 162 may be a personal computer or any other suitable computer system or device. In the case where any one of nodes 140, 150 and 160 is a wireless access point, its respective connect nodes among nodes 141, 142, 143, 151, 152, 161, and 162 may be a mobile smartphone, tablet, laptop computer, or any other type of wireless computing device.

By way of alternative, in a second exemplary aspect of the network 100, the network 100 may be a network of networks such as the internet or other any other suitable wide area network (WAN) or global area network (GAN). Each network node 110-162 may represent a subnetwork such as, for example, that described in relation to the first exemplary aspect or any other suitable type of network, e.g. a local area network (LAN), a wireless Local area network (W-LAN), a metropolitan area network (MAN), etc.

Figure 1B:
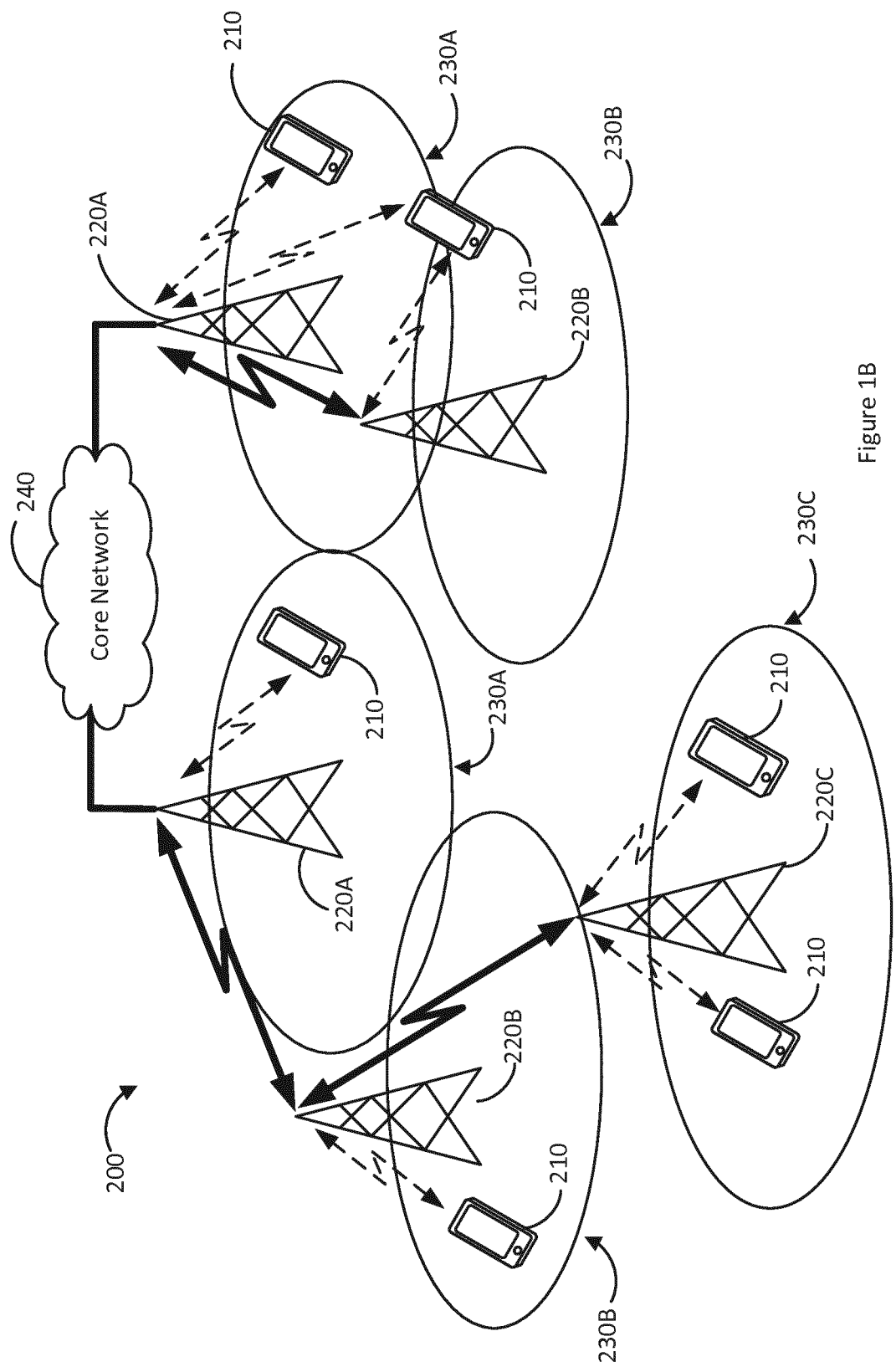
FIG. 1B is a schematic illustration showing a radio communication system, according to an example aspect herein.

By way of further alternative, in other example aspects, the network 100 may be a wireless cellular telecommunications network, such as that shown in FIG. 1B, which is a schematic illustration showing a radio communication system 200, according to an example aspect herein. Radio communications system 200 is a non-limiting example of the generalized telecommunications network 100 shown in FIG. 1A.

The radio communications system 200 comprises a plurality of user equipments (UE) 210 and a plurality of radio base stations 220A, 220B, 220C, 220D, 220E. In the present example aspect, the radio base stations 220A, 220B, 220C, 220D, 220E are an example of a plurality of network nodes. Each radio base station 220A, 220B, 220C, 220D, 220E may, as in the present embodiment, be an LTE-A eNodeB. Alternatively, each radio base station 220A, 220B, 220C, 220D, 220E may be, for example, a 5G gNB (next generation NodeB), LTE eNodeB, a 3G nodeB, or any other suitable base station.

Each radio base station 220A, 220B, 220C, 220D, 220E is associated with a respective cell 230A, 230B, 230C, 230D, 230E and provides access to a radio communications network for the UEs 210 in that cell 230A, 230B, 230C, 230D, 230E, for example via beamforming. In the example aspect shown in FIG. 1B, each radio base station 220A, 220B, 220C, 220D, 220E illustrated serve one or two UEs 210. However, in alternative embodiments, any of the radio base stations 220A, 220B, 220C, 220D, 220E may provide service to multiple UEs (e.g. three or more UEs). Furthermore, in the example aspect shown in FIG. 1B, the wireless cellular telecommunications network comprises five cells 230A, 230B, 230C, 230D, 230E. By way of alternative, the suitable wireless cellular telecommunications network may comprise, for example, one or more cells, 10 or more cells, 210 or more cells, or any other suitable number of cells.

Each UE 210 may be in radio communication with the radio base station 220A, 220B, 220C, 220D, 220E of the cell 230A, 230B, 230C, 230D, 230E within which it is located. Each UE 210 may, as in the present embodiment, be configured to transmit data and/or uplink control information to the radio base station 220A, 220B, 220C, 220D, 220E of the cell 230A, 230B, 230C, 230D, 230E in which it is located on uplink channels and to receive information transmitted by that radio base station 220A, 220B, 220C, 220D, 220E on downlink channels.

Furthermore, each UE 210 may be mobile, such that the UE 210 can be used while the user is moving and, as the user passes the boundary from a first cell 230A, 230B, 230C, 230D, 230E to the next, the UE 210 is handed over from the radio base station 220A, 220B, 220C, 220D, 220E of the first cell 230A, 230B, 230C, 230D, 230E to that of the next cell 230A, 230B, 230C, 230D, 230E.

Each radio base station 220A, 220B, 220C, 220D, 220E may be configured to communicate (directly or via another radio base station) with a core network 240. In the example aspect of FIG. 1B, radio base stations 220A, 220B, 220C, 220D, 220E are radio base stations are configured to provide integrated access and backhaul (IAB). In particular, radio base stations 220A, 220B are configured as IAB donor nodes and radio base stations 220C, 220D, 220E are configured as IAB relay nodes.

The IAB donor nodes 220A, 220B may be provided with, for example, a wired link or backhaul 500 (e.g. a fiber backhaul) providing access to the core network 240. However, IAB relay nodes 220C, 220D and 220E do not have a direct link to the core network 240. Instead, the IAB donor nodes 220A, 220B provide access to the core network 240 to the IAB relay nodes 220C, 220D, 220E via a radio backhaul link 600. The IAB relay nodes 220C, 220D, 220E multiplex access links (that is, communication between UEs and the radio base station) and backhaul links (that is, communication between two radio base stations or a radio base station and a core network) in, for example, time, frequency, and/or space (e.g. by beam-based operation). This approach, whereby access and backhaul links of a radio base station share the same wireless channel, may also be referred to as self-backhauling, SBH.

In some example aspects, such as in the present example, multi-hop wireless self-backhauling may be supported. That is, an IAB relay node 220E may connect to the core network via an IAB donor node 220A and one or more intervening IAB relay nodes 220C. In the example of FIG. 1B, the first plurality of network nodes comprising radio base stations 220A, 220C and 220E has two backhaul hops, the first between IAB relay nodes 220E and 220C and the second between IAB relay node 220C and IAB donor node 220A, and the second plurality of nodes comprising radio base stations 220B and 220D has a single backhaul hop between these two base stations. However, in alternative example aspects, any number of backhaul hops may be supported (e.g. three or more hops). By way of further alternative, in some example aspects, up to a maximum number of backhaul hops may be supported in order to ensure latency and other service requirements are met (e.g. up to four or more hops).

As a result of the reliance of the IAB relay nodes 220C, 220E on their IAB donor node 220A in order to access the core network 240, the performance of each of the first plurality of network nodes comprising radio base stations 220A, 220C and 220E may be interdependent in that a performance issue in one node may affect the performance of the connected nodes. By way of example, an increase in traffic or number of attached users at radio base station 220E will affect radio base stations 220C and 220A as these, in turn, will have to perform an increased volume of backhaul transmission. By way of further example, an increase in latency in the IAB donor node 220A will result in proportional increases in latency in the IAB relay nodes 220C and 220E. Similarly, the performance of the second plurality of nodes comprising IAB relay node 220D and IAB donor node 220B may be interrelated.

Accordingly, the radio communications system 200 of FIG. 1B provides two examples of a plurality of network nodes where the performance of each the nodes is interdependent. Alternatively, all of the radio base stations 220A, 220B, 220C, 220D, 220E may be taken to be a single plurality of network nodes. By way of further alternative, in some example aspects, the performance of the radio base stations 220A, 220B, 220C, 220D, 220E may be interdependent because radio base stations 220A and 220B may be configured as donor eNBs and radio base stations 220C, 220D and 220E may be configured as relay nodes.

In telecommunications networks, such as that shown in FIG. 1A, it is vital that performance monitoring of the network nodes reflects how the values of the performance metrics of one node are correlated to the values of the performance metrics of other connected nodes in the network, because performance issues may propagate between connected nodes in these cases.

Figure 2:
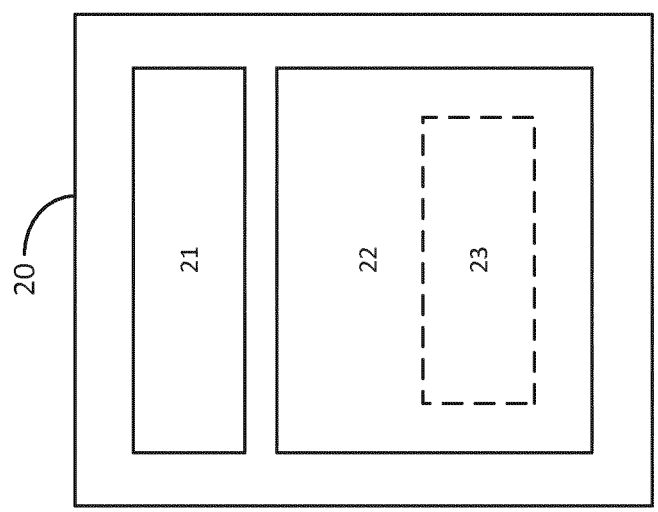
FIG. 2 is a schematic illustration of an apparatus for monitoring the performance of a plurality of network nodes using at least one node performance assessment thresholds, according to an example aspect herein.

FIG. 2 is a schematic illustration of an apparatus 20 for monitoring the performance of a plurality of network nodes 110-162 using at least one node performance assessment threshold, according to an example aspect herein.

The apparatus 20 comprises a storage module 21 and a processing module 22. Processing module 22 is an example of processing circuitry and storage module 21 is an example of a memory containing instructions executable by such processing circuitry. The processing module 22 is configured to obtain a plurality of data sets, wherein a data set comprises a respective value of a performance metric for each of the plurality of network nodes 110-162. The processing module 22 is further configured to classify each of the plurality of data sets as normal or abnormal by comparing the respective values of the performance metric of each of the plurality of network nodes 110-162 to a corresponding normality threshold, thus providing a plurality of classified data sets. The processing module is further configured to process the plurality of classified data sets using a machine-learning algorithm 23 in order to derive, for at least one network node of the plurality of network nodes 11-162, a node performance assessment threshold indicative of a value of the performance metric of the at least one node at which the plurality of network nodes has a predetermined likelihood of being classified as normal.

In some example aspects, such as the present example aspect, monitoring performance refers to any procedures, mechanisms or processes which allow abnormal behavior in a network node to be detected or identified. Abnormal behavior or abnormality may refer to any condition in a node that indicates that the node is not functioning correctly or optimally. This may be the case where a node is unable to perform a function (at all or in a required manner) or that the node risks or is experiencing damage or failure. By way of example, in any of the plurality of network nodes 110-162 of FIG. 1A, abnormal behaviours that should be detected may include a risk of failure, such as over-heating of the nodes hardware or a failure to perform a function such transmission with an acceptable latency. More generally, abnormal behaviours may be defined in relation to performance metrics, as discussed in more detail below.

As discussed in more detail above, the plurality of network nodes may be, for example, any set of two or more connected or neighbouring nodes in a telecommunications network. In the present example aspect, the plurality of network nodes comprises the plurality of network nodes 110-162 shown in FIG. 1A.

Each data set comprises a respective value of a performance metric for each of the plurality of network nodes 110-162. The performance metrics may be, for example, any suitable measure, score, index, value, etc. that provides a quantifiable or objective indication of how well a network node is performing.

By way of example, in exemplary aspects such as that of FIG. 1B in which the network is a mobile cellular network, multiple performance management (PM) counters (for example, number of connected users, total bandwidth consumed, total power consumption) may be recorded in respect of each node and key performance indicators (KPIs) may be determined using the values of the PM counters. In particular, PM data may comprise counter values and other statistics recorded by the Operational Support Systems (OSS) of a network that may be used to assess how well data is flowing in the network. Data recorded using PM counters may comprise, by way of non-limiting example, the Interference over Thermal noise (IoT) ratio, interference noise and/or thermal noise levels of one or more cells, the number of calls dropped for one or more cells, the number of attempted handovers, the number of successful handovers and/or handover failure rate for one or more cells, and/or any suitable utilization metrics which provide a measure of how far the network (or portion thereof, such as a cell or the plurality of cells associated with the plurality of network nodes) is from maximum capacity.

Corresponding KPIs may be determined using the data obtained from the PM counters. By way of example, in the case of contemporary mobile networks such as the radio communication system of FIG. 1B, KPIs may be reflective of any one of the following aspects how the network as a whole or a single node (a cell and its associated radio base station) is performing: accessibility, retainability, integrity, availability, mobility and energy efficiency. Accessibility may be defined as the ability of a service to be obtained, within specified tolerances and other given conditions, when requested by the user. Accessibility KPIs may include, by way of example, ERAB (E-UTRAN radio access bearer) set up success rate, RRC (radio resource control) set up success rate, call setup success rate, or any other suitable measure.

Retainability may be defined as the ability of the network to retain services requested by a user for a desired duration once the user is connected to the services or as a probability that a service, once obtained by user, continues to be provided under given conditions for a given time duration. Retainability KPIS may, for example, comprise an average number of calls dropped per day of the cell, an average number of VoIP (voice over Internet protocol) calls dropped per day of the cell, or an average call completion success rate of the cell.

Integrity may be defined as the degree to which a service, once obtained, is provided without excessive impairments. Integrity KPIs may include KPIs reflective of throughput, such as a payload data volume per elapsed time unit, or KPIs indicative of latency, such as a time from reception of an IP packet to transmission of first packet or any other measure of the delay experienced by an end-user of the network.

Availability may be defined as the ability of a network to be a in a state to perform a required function at a given instant of time within a given time interval. Availability KPIs may include, for example, E-UTRAN cell availability, partial cell availability, or any other suitable measure.

Mobility may be defined as the ability of the network to allow movement of users while still retaining the service for the user. Mobility KPIs may include, for example, handover failure rate, intra-frequency handover out success rate, inter-frequency handover out success rate, inter-RAT handover out success rate, or any other suitable measure.

Energy efficiency KPIs may include any metric that reflects how efficiently the network operates in light of its power consumption, for example, data volume divided by energy consumption of the network or a subset of one or more network nodes.

Accordingly, in some example aspects, such as the present example aspect in which the network is a mobile communications network, the performance metric may comprise any one of the counters or any one of the Key Performance Indicators, KPIs, discussed above. The respective values of each of the plurality of KPIs may be based on the respective values of the plurality of counters. As is clear from the above discussion, the value of a KPI may be directly extracted as a value of a PM counter. Additionally, or alternatively, the value of a KPI be comprise a mathematical relation based the values of one or more PM counters and/or data collected from other sources (such as, for example, site configuration data).

In a similar manner to that discussed above for mobile communications networks, suitable KPIs and other performance metrics may be defined for any of the types of telecommunications network discussed in relation to FIG. 1A.

The processing module 22 may, as in the present embodiment, be configured to obtain data, such as the plurality of data sets, by any suitable means known to those versed in the art. By way of example, processing module 22, may read the data from a storage medium such as a CD or hard disk which may be used to transfer information or to receive data via network such as the Internet. Furthermore, processing module 22 may receive data directly from the plurality of network nodes via a direct communication link (which may be provided by any suitable wired or wireless connection, e.g. a Universal Serial Bus (USB) or a Bluetooth™ connection), or an indirect communication link (which may be provided by a network comprising a Local Area Network (LAN), a Wide Area Network (WAN) and/or the Internet).

The apparatus 20 may further comprise any suitable means necessary to enable the processing module 22 to obtain data, such as, for example, one or more transmitters and receivers, peripheral devices (e.g. input devices such as keyboards, output devices, such as a display device and/or input/output devices such as touch panels), interfaces (such as serial and/or parallel ports).

The processing module 22 and the storage module 21 may be implemented by any suitable means known to those skilled in the art. By way of example, the processing module 22 may comprise one or more microprocessors and/or microcontrollers, as well as other digital hardware, which may include digital signal processors (DSPs), special-purpose digital logic, and/or any other suitable hardware, software or firmware. The processing module 22 may be configured to perform the above functions by executing a computer program code or computer program stored in the storage module 21 or in any other suitable way. The storage module 21 may be provided as one or several types of memory such as read-only memory (ROM), random-access memory, cache memory, flash memory devices, optical storage devices, etc.

Figure 3:
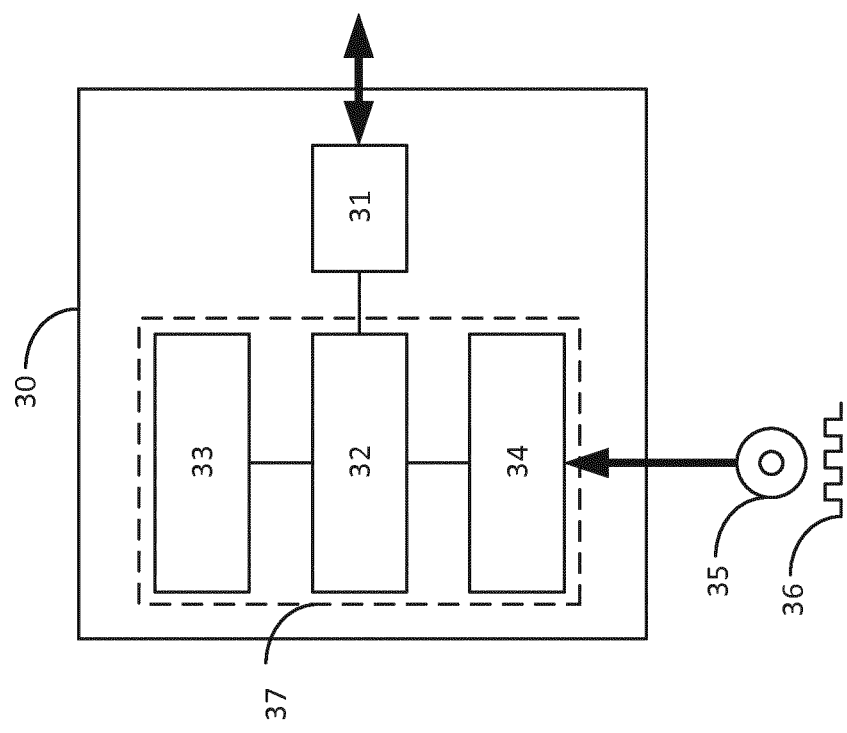
FIG. 3 is a block diagram illustrating an example signal processing hardware configuration of the apparatus of FIG. 2, according to an example aspect herein.

By way of particular example, FIG. 3 is a schematic illustration of a programmable signal processing hardware 30, which may, as in the present example aspect, be configured to function as the apparatus 20 of FIG. 2.

The programmable signal processing hardware 30 comprises a communication interface (I/F) 31. The signal processing apparatus 30 further comprises a processor (e.g. a Central Processing Unit, CPU, or Graphics Processing Unit, GPU) 32, a working memory 33 (e.g. a random access memory) and an instruction store 34 storing a computer program comprising the computer-readable instructions which, when executed by the processor 32, cause the processor 32 to perform various functions including those of the processing module described above in relation to FIG. 2. The instruction store 34 may comprise a ROM (e.g. in the form of an electrically-erasable programmable read-only memory (EEPROM) or flash memory) which is pre-loaded with the computer-readable instructions. Alternatively, the instruction store 34 may comprise a RAM or similar type of memory, and the computer-readable instructions of the computer program can be input thereto from a computer program product, such as a non-transitory, computer-readable storage medium 35 in the form of a CD-ROM, DVD-ROM, etc. or a computer-readable signal 36 carrying the computer-readable instructions. In any case, the computer program, when executed by the processor, causes the processor to execute at least one of the methods for monitoring the performance of a plurality of network nodes using at least one node performance assessment threshold described herein. It should be noted, however, that the apparatus 20 may alternatively be implemented in non-programmable hardware, such as an application-specific integrated circuit (ASIC).

In the present example aspect, a combination 37 of the hardware components shown in FIG. 3, comprising the processor 32, the working memory 33 and the instruction store 34, is configured to perform functions of the storage module 21 and the processing module 22, which functions will now be described in further detail below.

Figure 4:
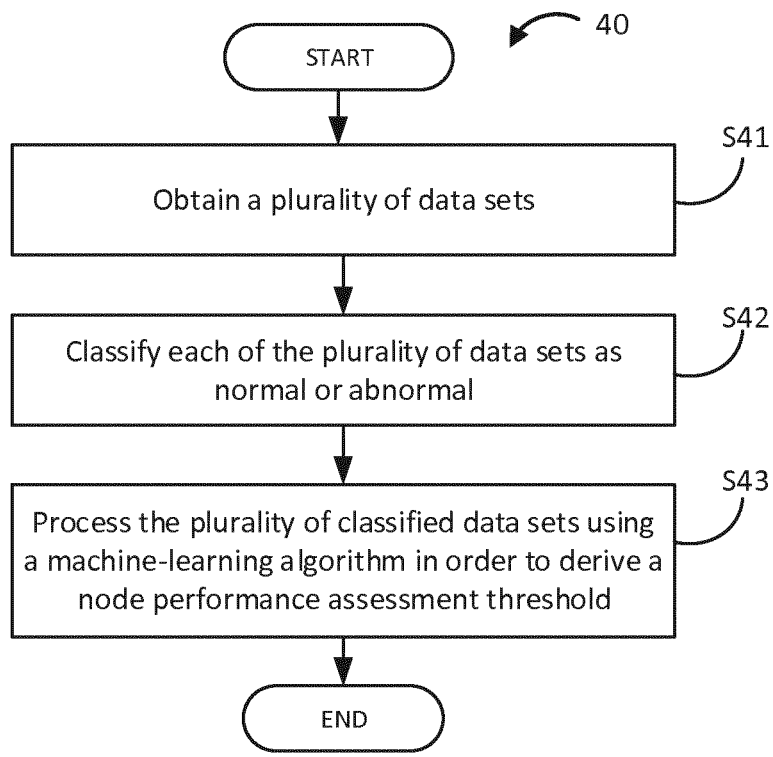
FIG. 4 is a flow diagram illustrating a process by which the apparatus of FIG. 2 may monitor the performance of a plurality of network nodes using at least one node performance assessment thresholds, according to an example aspect herein.

FIG. 4 is a flow diagram illustrating a process 40 by which the apparatus of FIG. 2 may monitor the performance of a plurality of network nodes 110-162 using at least one node performance assessment threshold, according to an example aspect herein.

In process step S41 of FIG. 4, the processing module 22 obtains a plurality of data sets, wherein a data set comprises a respective value of a performance metric for each of the plurality of network nodes 110-162. The processing unit may be configured to obtain data, e.g. the plurality of the data sets, by any of the means discussed above in relation to FIG. 2. That is, each data set may contain a single value for the performance metric for each network node, such that the number of values in each data set is equal to the number of network nodes.

In some example aspects, such as in the present example aspect, each data set may comprise the same number of values. Additionally, in some example aspects, the number of values in each data set may correspond to a number of input nodes of the machine-learning algorithm 23, which will be discussed in more detail below.

In some example aspects, each data set may optionally further comprise respective values of a plurality of performance metrics for each of the plurality of network nodes 110-162. That is, each data set may contain a single value for each performance metric for each network node, such that the number of values in each data set is the product of the number of network nodes and the number of performance metrics.

The performance metric and the plurality of may be any of those metrics, PM counters and key performance indicators described above in relation to FIG. 2 and/or any other suitable performance metric.

An exemplary data set, for a case in which the data comprises respective values of a plurality of performance metrics for each of the plurality of network nodes 110-162 is shown in Table 1 below. The plurality of data sets may comprise a plurality of data sets as shown in FIG. 1.

TABLE 1

| Network Node | Performance Metric | Value |
|---|---|---|
| Node 110 | Metric_1 | XXX1 |
|  | Metric_2 | XXX2 |
|  | Metric_3 | XXX3 |
| Node 120 | Metric_1 | YYY1 |
|  | Metric_2 | YYY2 |
|  | Metric_3 | YYY3 |
| . | . | . |
| . | . | . |
| . | . | . |
| Node 162 | Metric_1 | ZZZ1 |
|  | Metric_2 | ZZZ2 |
|  | Metric_3 | ZZZ3 |

In general, there is no limit on the number of data sets that may be obtained or a minimum number of data sets that should be obtained. However, the number of data sets obtained should be sufficient to reflect the majority of usage conditions (e.g. in terms of volume of traffic and data, number of users, etc.) that may realistically be expected to occur in the plurality of network nodes 110-162 during their lifetime.

In some example aspects, the data sets may be produced and stored in advance and the processing module may be configured to obtain the data sets by obtaining the stored data sets. Accordingly, in such example aspects, the processing module 22 may be configured to obtain the plurality of data sets in a finalized form that may be directly classified, as discussed in detail below in relation to process step S42, without requiring further processing.

Alternatively, in some example aspects, such as the present example aspect, the processing module may be configured to obtain the plurality of data sets by receiving data indicative of a value of each of one or more performance metrics of each of the plurality of network nodes 110-162 and processing the data in order to produce the plurality of data sets. The data may be received from, for example, each network node directly or from any suitable centralized data storage of the network, e.g. cloud storage or server. The processing may comprise any suitable processing steps required to sort the received data into data sets. For example, the processing may include, for each data set, identifying values for each of the one or more performance metrics for each of the network nodes corresponding to a particular time period, a particular test or trial, or a particular set of conditions, etc. and associating the identified values as a data set. Additionally, or alternatively, the processing may comprise any processing steps that allow the data sets to be more conveniently processing, such as, for example, quantising, converting the values to a particular format, indexing the values, etc.

In some example aspects, the values of the performance metric or metrics for each of the plurality of network nodes 110-162 included in the data sets may be empirical data, measured or otherwise obtained from the plurality of network nodes 110-162 at different times and/or under different usage and load conditions to order to obtain a plurality of data sets having different values. By way of example, PM data may be collected for in respect of each network node (radio base station and associated cell) during a given data collection period (e.g. one week, two weeks, a month, etc.) By way of example, KPIs are normally obtained by aggregating counters for a 1 to 2 week collection period. Furthermore, KPIs may be calculated based on collected data as, for example, any one of an average, median, maximum and minimum value of the data per day, per hour, per week, etc.

Additionally, or alternatively, the values of the performance metric or metrics for each of the plurality of network nodes 110-162 included in the data sets may be derived computationally, by simulating a model of the plurality of nodes and varying input parameters of the simulation reflective of different usage and load conditions to order to obtain a plurality of data sets having different values.

In some example aspects, such as the present example aspect, the processing module may be further configured to initiate one or more stress tests in the plurality if network nodes in order to generate the data sets, prior to or as part of obtaining the plurality of data sets.

By way of example, the one or more stress tests may comprise obtaining an initial data set corresponding to an initial set of network conditions in the plurality of network nodes 110-162.

The initial set of network conditions may include, for example, any conditions, parameters or characteristics of an individual node or of the plurality of nodes as a whole that may affect how the nodes perform, such as, for example, the number of UEs in the respective cells of each network node, the system voltage, the transmission power, the volume of traffic, the type of traffic (e.g. voice, video, data, etc.), the conditions for handover between cells in a mobile communications network, a buffer size in the nodes, etc. Accordingly, the values of the one or more performance metrics of the plurality of network nodes 110-162 in the initial data set may correspond to the initial set of network conditions.

The one or more stress tests may further comprise, by way of example, updating the values of at least one of the one or more performance metrics in order to obtain an updated data set by adjusting a parameter of at least one of the network node. The parameter may be associated with the at least one of the one or more performance metrics such that a change in the value of that parameter results in a corresponding change in the values of at least one of the one or more performance metrics.

By way of example, in a case where the performance metric is latency, a parameter that causes an update in this performance metric may be the number of active UEs in a cell (in a mobile communications network), the number or wireless computing devices connected to a wireless access point, the number of active UEs or wireless computing devices in a location, etc. Alternatively, an adjustment in any of these parameters may also be used to effect an update in a case where the performance metric is throughput. By way of further alternative, in a case where the performance metric is a mobility KPI (e.g. in a mobile communications network), a parameter that causes an update in this performance metric may be inter-site configuration with multi UE. As a further example, in a case where the performance metric is power, this performance metric may be updated by adjusting a parameter such as a voltage of the power supply unit (PSU) or a system voltage pf a power amplifier (PA). Other adjustable parameters may include activity as access control, Backhaul and Access loading of one or more UEs, CSI-RS signals and PA power variation between sites.

The one or more system tests may then comprise repeatedly updating the values of at least one of the one or more performance metrics by adjusting the parameter by varying amounts and in different network nodes until a plurality of data sets (including the initial data set) are obtained.

In some example aspects, the one or more system tests may optionally further comprise repeatedly updating the values of at least one of the one or more performance metrics by adjusting one or more additional parameters by varying amounts and in different network nodes in order to obtain further updated data sets. Additionally, or alternatively, the one or more system tests may optionally further comprise repeatedly updating the values of at least one of the one or more performance metrics by adjusting varying combinations of parameters (e.g. adjusting 2 or 3 parameters at a time) by varying amounts and in different network nodes in order to obtain further updated data sets.

As discussed above, the values of the performance metric or metrics for each of the plurality of network nodes 110-162 included in the data sets may be empirical data or derived from simulating a model of the plurality of nodes. In the first case, the adjustment of parameters of the network node may be achieved, for example, by actually adjusting the parameter in real-time in the actual nodes (e.g. adjusting a system voltage in a network node). Such an approach may be particularly suitable for data sets collected before a plurality of network nodes 110-162 (e.g. one or more network sites) are handed over to an operator or user, during an installation and acceptance phase.

In the second case, in which the values of the performance metric or metrics for each of the plurality of network nodes 110-162 included in the data sets are derived from simulating a model, adjusting one or more parameters in one or more nodes may be readily achieved by varying input parameters of the simulation. Again, such simulation based stress tests may be performed before handover of the site to an operator or user, and/or can be run periodically, whenever equipment on the site detects that there is no traffic (e.g. during night-time), or on request during the site's lifetime.

In some example embodiments, the processing module 22 may be configured to execute such stress tests periodically. This approach may be particularly suitable where the plurality of data sets is obtained by simulation of a model of the plurality of network nodes 110-162 that is readily available to the processing module 22, e.g. the model may be stored in the storage module 21 or is accessible by the processing module 22 on a remote server.

By way of alternative, the processing module may be triggered to perform such stress tests by any suitable entity such as a Network Operations Centre (NOC) or another network node. This entity may be configured to automatically trigger the processing module 22 to perform the stress tests or the entity may be configured to trigger the processing module 22 to perform the stress tests in response to an instruction input by a network operator or other user.

Alternatively, in some example aspects in which the performance metrics include one or more KPIs, is also possible that the stress tests can be initiated when a new KPI or KPIs is/are defined in the NOC or other suitable network entity, together with an initial set of relations to PM counters (e.g. using equations). The new KPI may be defined by a network operator, a network engineer, a third party or any other suitable user.

By way of still further alternative, in a case where stress tests are carried out during the lifetime of the plurality of network nodes 110-162 and the performance metrics include one or more KPIs, it is possible to also compare all PM counter together in all possible permutations and identify which combinations of PM counter values result to failures. A critical failure would be indicated by a critical alarm. Over time, these PM counters may be combined together to create new KPIs.

In process step S42 of FIG. 4, the processing module 22 classifies each of the plurality of data sets as normal or abnormal by comparing the respective values of the performance metric of each of the plurality of network nodes to a corresponding normality threshold, thus providing a plurality of classified data sets.

The normality threshold for any given performance metric may include a maximum threshold, a minimum threshold, or both. A maximum threshold for a given performance metric is a threshold for which values of the performance metric that are greater than (or greater than or equal to) this threshold may be considered to be indicative of abnormal behaviour in a network node. Similarly, a minimum threshold for a given performance metric is a threshold for which values of the performance metric that are less than (or less than or equal to) this threshold may be considered to be indicative of abnormal behaviour in a network node. In cases were the normality threshold comprises both a maximum threshold and a minimum threshold, these two thresholds may define a range such that values of the performance metric falling outside this range may be considered to be indicative of abnormal behaviour in a network node.

In general, the number and type of corresponding normality threshold for a given performance metric will depend on the nature of that performance metric. By way of example, for performance metrics such as latency, for which low values indicate optimum performance in the network node, the normality threshold may be a maximum threshold such that abnormal behaviour is indicated by the latency exceeding the maximum threshold. Similarly, for performance metrics such as throughput. for which high values indicate optimum performance in the network node, the normality threshold may be a minimum threshold such that abnormal behaviour is indicated by the throughput dropping below the minimum threshold.

More generally, any suitable number and type of corresponding normality threshold may be provided as the corresponding normality threshold of a given performance metric.

Accordingly, the processing module 22 may be configured to classify a data set among the plurality of data sets as normal if the respective values of the performance metric of all of the plurality of network nodes compare favourably to the normality threshold so that abnormal behaviour is not indicated in any network node (e.g. do not exceed a maximum threshold, are above a minimum threshold or fall within a given range). Similarly, the processing module 22 may be configured to classify a data set as abnormal if the respective values of the performance metric of at least one of the plurality of network nodes compares unfavourably to the corresponding normality threshold so that abnormal behaviour is indicated in the at least one network node (e.g. exceeds a maximum threshold, falls below a minimum threshold or falls outside a given range).

The value of the normality threshold may be a predetermined value set by a network operator or other user. Alternatively, the value of the normality threshold may be set semi-statically or dynamically by a network operating centre (NOC) or any other suitable node in the network, either automatically (e.g. periodically or in response to a certain condition) or in response to an instruction input by a network operator or other use.

In some example aspects in which each data set further comprises respective values of a plurality of performance metrics for each of the plurality of network nodes 110-162, classifying each of the plurality of data sets may optionally further comprise comparing each of the values of one or more of the plurality of performance metrics to one or more corresponding normality thresholds.

In such example aspects, each of the plurality of performance metrics may have a corresponding normality threshold. In such example aspects, the processing module 22 may be configured to classify a data set among the plurality of data sets as normal if the respective values of each of the plurality of performance metrics of all of the plurality of network nodes compare favourably to the normality threshold so that abnormal behaviour is not indicated in any network node. Similarly, the processing module 22 may be configured to classify a data set as abnormal if the values of any of the plurality of performance metrics of one or more of the plurality of network nodes compares unfavourably to the corresponding normality threshold so that abnormal behaviour is indicated in the at least one network node.

Additionally, or alternatively, in example aspects in which each data set further comprises respective values of a plurality of performance metrics for each of the plurality of network nodes 110-162, each of the plurality of data sets classified as abnormal may be optionally further classified according to at least one of the plurality of performance metrics to which abnormal operation is attributable. That is, each data set classified as abnormal may be classified according to the performance metric that compared unfavourably to the corresponding normality threshold in one or more nodes, such that the classification also indicates how the plurality of network nodes are operating abnormally.

By way or further alternative or addition, in some example aspects, each of the plurality of data sets classified as abnormal is further classified according to at least one network node of the plurality of network nodes to which abnormal operation is attributable. That is, each data set classified as abnormal may be classified according to the network node for which one or more performance metrics compared unfavourably to the corresponding normality threshold, such that the classification also indicates which node or nodes of the plurality of network nodes are operating abnormally.

In process step S43 of FIG. 4, the processing module 22 processes the plurality of classified data sets using a machine-learning algorithm 23 in order to derive, for at least one network node of the plurality of network nodes, a node performance assessment threshold indicative of a value of the performance metric of the at least one node at which the plurality of network nodes has a predetermined likelihood of being classified as normal.

In some example aspects, the processing module 22 may be configured to process the plurality of classified data sets using a machine-learning algorithm 23 by training the machine-learning algorithm 23 to classify new, previously unseen data sets as normal or abnormal using the plurality of classified data sets as training data. Accordingly, the trained machine-learning algorithm 23 may be a classification algorithm. The machine-learning algorithm 23 may, as in the present embodiment, be a supervised learning algorithm. In particular, the learning algorithm may, as in the present embodiment, be a supervised learning algorithm comprising a neural network.

Figure 5A:
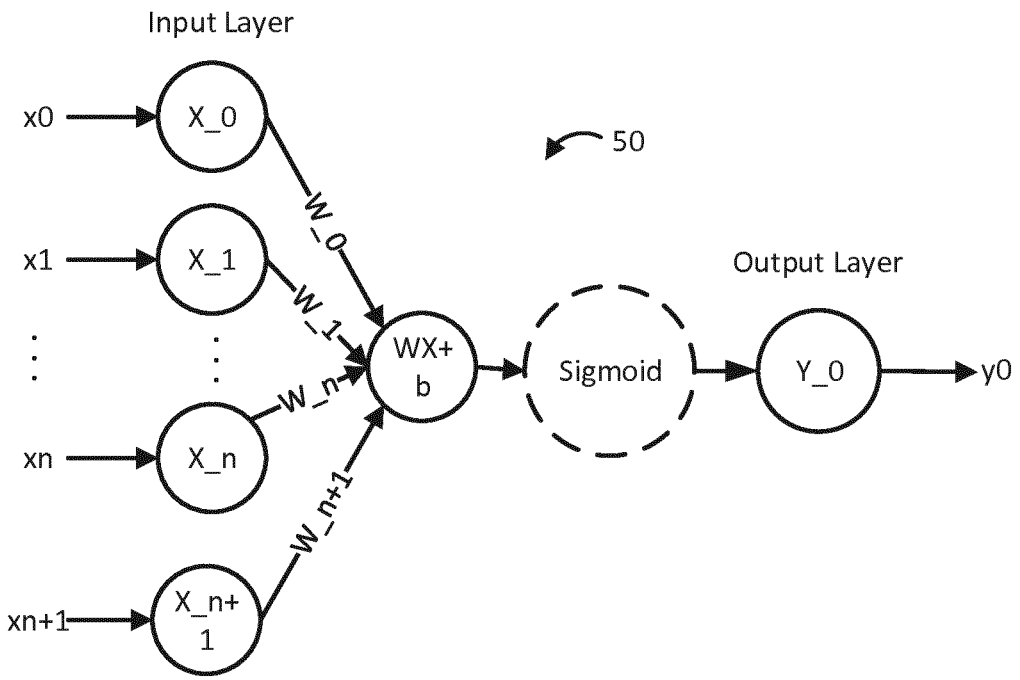
FIG. 5A is a schematic illustration of a machine-learning algorithm, according to a first example aspect herein.

FIG. 5A is a schematic illustration of a machine-learning algorithm 50, according to an example aspect herein. The machine-learning algorithm 50 is an example of machine-learning algorithm 23.

In some example aspects, the machine-learning algorithm 50 may be a supervised learning algorithm (such as a neural network, a convolutional neural network, a support vector machine or an evolutionary algorithm, for example). By way of example, the machine-learning algorithm 50 may, as in the present embodiment, be a neural network, which automatically generate identifying characteristics by processing the input training data, such as the plurality of data sets, without any prior knowledge.

In such example aspects, the machine-learning algorithm 50 may be figured to learn from, and make predictions based on, input data by building a model or classification algorithm from training data may comprising the classified data sets, the classification of each data set representing the desired outcome for the classification by the machine-learning algorithm of that data set.

As illustrated in FIG. 5A, in general, a machine-learning algorithm 50 consists of an input layer having multiple input nodes X_0, X_1, . . . , X_n, X_n+1 corresponding to inputs x0, x1, . . . , xn, xn+1 as shown. The inputs correspond to the values of a single data set as well as an input for its classification as normal or abnormal. Accordingly, more or less inputs nodes may also be provided depending on the number of performance metrics considered and the number of network nodes considered which dictate the number of inputs x0, x1, . . . , xn, xn+1 per data set.

The machine-learning algorithm 50 may further comprise an output layer having at least one output node Y_0 and, optionally, multiple hidden layers (not shown). Each of the layers is composed of one or more machine learning (ML) nodes (X_0, X_1, . . . , X_n, X_n+1, WX+b, Sigmoid and Y_0 in FIG. 5), and each layer may perform different kinds of transformations on their inputs. Each ML node may be connected to multiple ML nodes in adjacent layers. The output of each ML node may be computed by some non-linear function of the sum of its inputs. ML nodes and the connections therebetween typically have respective weights (e.g. W_0, W_1, . . . , W_n, W_n+1 in FIG. 5) which determine the strength of the signal at a given connection. These weights are adjusted as learning proceeds, thereby adjusting the output of the machine-learning algorithm 50. Signals travel from the first layer (the input layer), to the last layer (the output layer), and may traverse the layers multiple times.

The output y0 of the machine-learning algorithm 50 may be viewed as a probability of the input data set being classified as normal (or abnormal). By way of example, the data set may be considered to be normal in a case where this probability exceeds any suitable value (e.g. 50%, 75%, 90%), and may be considered to be abnormal otherwise.

In some example aspects, such as that shown in FIG. 5, an ML node having a sigmoid function may be provided immediately before the output layer. A sigmoid function may take any real numbers as an input, with return a monotonically increasing value between, for example, 0 to 1 or alternatively between −1 to 1. As such, sigmoid functions may allow the output of the trained machine-learning algorithm 50 to output the probability of the input data set being classified as normal (or abnormal) in a convenient format that may be readily converted to a percentage, a fraction, etc.

Figure 5B:
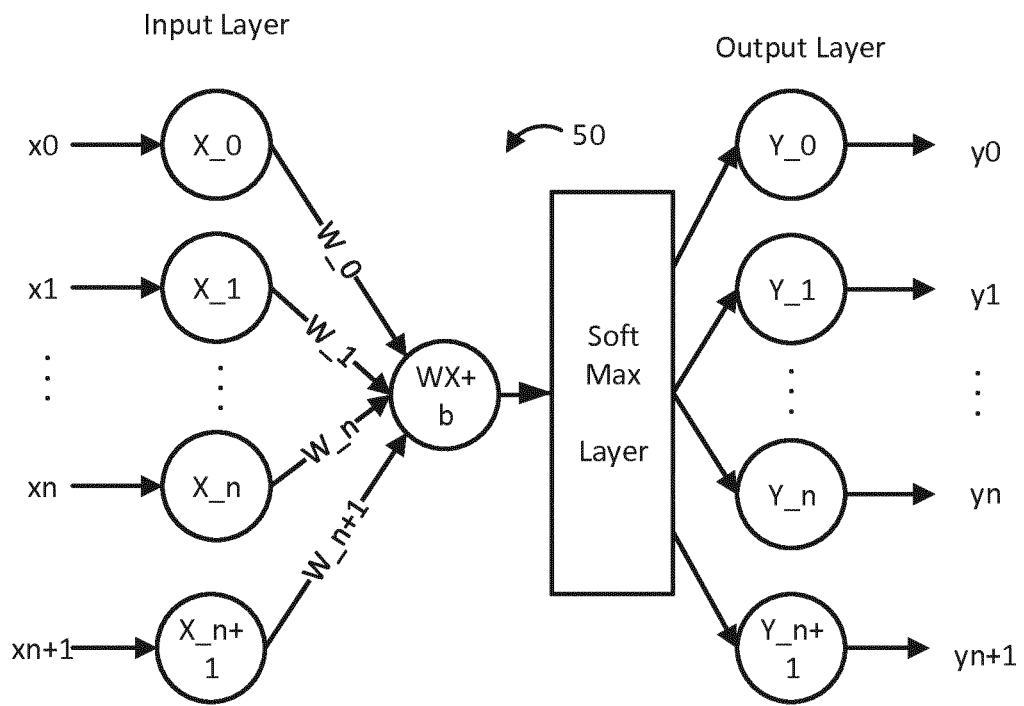
FIG. 5B is a schematic illustration of a machine-learning algorithm, according to a second example aspect herein.

FIG. 5B is a schematic illustration of a machine-learning algorithm 50, according to a second example aspect herein. The machine-learning algorithm 50 of FIG. 5B is a further example of machine-learning algorithm 23.

In some example aspects, in which any data set classified as abnormal by the processing module 22 is further classified according to at least one metric of the plurality of performance metrics to which abnormal operation is attributable and/or according to at least one network node of the plurality of network nodes to which abnormal operation is attributable, the machine-learning algorithm 50 may be further trained to classify new, previously unseen data sets as normal or abnormal according to at least one metric of the plurality of performance metrics to which abnormal operation is attributable and/or according to at least one network node of the plurality of network nodes to which abnormal operation is attributable.

In order to achieve this, the machine-learning algorithm 50 may be further provided with one or more additional layers (each comprising one or more ML nodes) which are trained to output a probability of the input data set being classified as each class of a plurality of classes, wherein the probabilities all add up to 1 (that is, a multiclass problem rather than the single class problem described in relation to FIG. 5A). By way of example, the class to which a data set belongs may be selected as a class having the highest probability or in any other suitable way. Optionally, each output node may be preceded by an ML node having a sigmoid function, as discussed above in relation to FIG. 5A.

By way of example, in FIG. 5B the machine-learning algorithm 50 is provided with a SoftMax layer before the output layer, which has a number of nodes (not shown) equal to the number of nodes in the output layer. A SoftMax layer assumes that each data set is a member of exactly one class. Therefore, the classes may be appropriately defined as, for example, one normal class and abnormal classes indicating each node and each combination of nodes that are behaving abnormally, or, by way of alternative example, as normal and abnormal indicating each performance metric and each combination of performance metrics that compared unfavourably to the normality threshold. By way of further alternative, the classes may reflect combinations of one or more nodes and one or more performance metrics to which abnormal behaviour is attributable.

By way of example, the SoftMax layer may be replaced with multiple logistic regressions which may be configured to allow a data set to be classified as a member of multiple classes simultaneously.

The processing module 22 may be further configured to derive, for at least one network node of the plurality of network nodes, a node performance assessment threshold indicative of a value of the performance metric of the at least one node at which the plurality of network nodes has a predetermined likelihood of being classified as normal based on the trained machine-learning algorithm 50.

The present inventors have recognised the need to assess the performance of individual network nodes in light of the interdependence between connected nodes because performance issues may propagate between connected nodes in these cases. By way of example, FIG. 6A is a schematic illustration showing the relationship between performance metrics of connected network nodes.

Figure 6A:
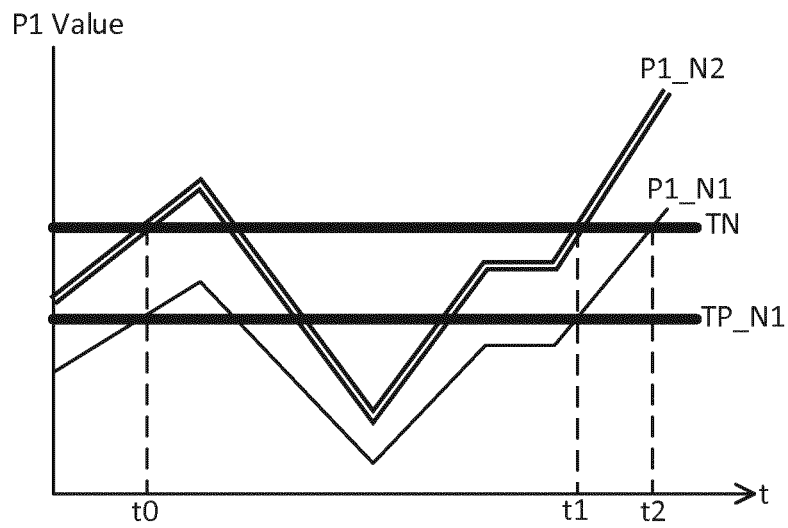
FIG. 6A is a schematic illustration showing the relationship between performance metrics of connected network nodes.

FIG. 6A illustrates how the values of an exemplary performance metric P1 may very over time for each of two network nodes N1 and N2. In the example aspect of FIG. 6, network nodes N1 and N2 are connected or neighbouring nodes, N2 is a network node that is closer to an edge of a network (for example, network node 135 in FIG. 1A or radio base station 200B in FIG. 1B) and network node N1 is a network node that is further from the edge of the network (e.g. network node 130 in FIG. 1A or radio base station 200A in FIG. 1B).

As can be seen in FIG. 6A, the value performance metric P1 varies in a similar manner for both network nodes N1 and N2 as, for example, traffic, processing loads, etc. in that part of the network vary. However, the extent to which the value of performance metric P1 varies is dependent on the relative position of nodes N1 and N2 in the network. By way of example, in the example aspect of FIG. 6A, performance metric P1 may be a metric such as, for example, latency, the value of which tends to increase the further a node is from a core or centre of a network or from a network node that initiated transmission. As network node N1 is connected to network node N2 such that node N2 is closer to the edge of the network, the value of a performance metric P1, such as latency, measured at network node N2 will always be greater than that measured at network node N1.

As shown in FIG. 6A, the value of performance metric P1 of network node N1 exceeds the corresponding normality threshold TN at time t2. However, by deriving a node performance assessment threshold TP_N1 indicative of a value of the performance metric P1 of network node N1 at which both network nodes N1 and N2 have a predetermined likelihood of being classified as normal, it is possible, based on the value of the performance metric P1 of network node N1 to determine at times t0 and t1 that, given the relationship between the performance metrics of nodes N1 and N2, that the value of the performance metric P1 of network node N2 is likely to have exceeded the corresponding normality threshold.

Figure 6B:
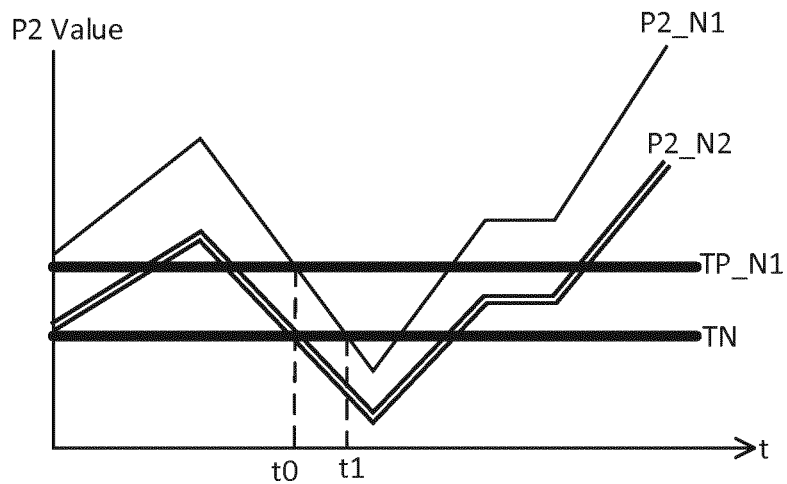
FIG. 6B is a schematic illustration showing the relationship between performance metrics of connected network nodes.

FIG. 6B is a schematic illustration in accordance with an alternative example aspect showing the relationship between performance metrics P2 of connected network nodes N1 and N2. Performance metric P2 may be a metric such as, for example, throughput, the value of which tends to decrease the further a node is from a core or centre of a network or from a network node that initiated transmission. As network node N1 is connected to network node N2 such that node N2 is closer to the edge of the network, the value of a performance metric P2, such as throughput, measured at network node N2 will always be less than that measured at network node N1.

As shown in FIG. 6B, the value of performance metric P2 of network node N1 falls below the corresponding normality threshold TN at time t1. However, by deriving a node performance assessment threshold TP_N1 indicative of a value of the performance metric P2 of network node N1 at which both network nodes N1 and N2 have a predetermined likelihood of being classified as normal, it is possible, based on the value of the performance metric P2 of network node N1 to determine at time t0 that, given the relationship between the performance metrics of nodes N1 and N2, that the value of the performance metric P2 of network node N2 is likely to have exceeded the corresponding normality threshold.

Figure 6C:
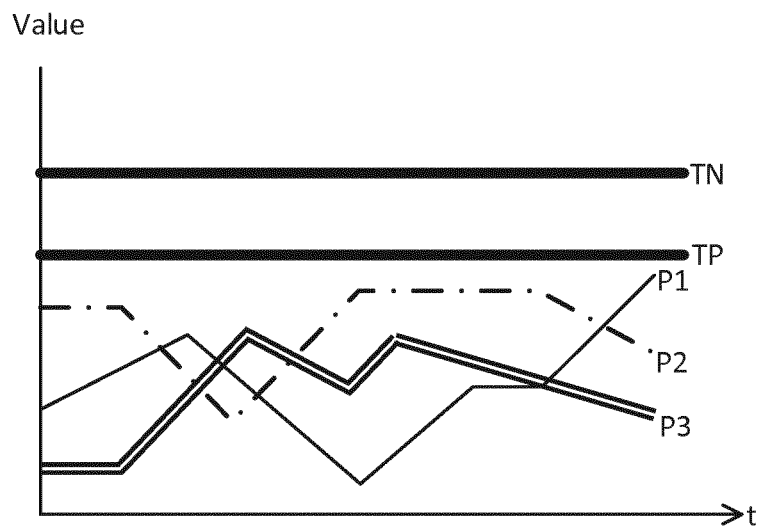
FIG. 6C is a schematic illustration showing the relationship between the performance metrics of a node and at least one node performance assessment threshold.

FIG. 6C is a schematic illustration showing the relationship between the performance metrics P1, P2, P3 of a node and at least one node performance assessment threshold TP. In the example aspect of FIG. 6C, the at least one node performance threshold may be associated with any network node, such as nodes 110-162 in FIG. 1a or radio base stations 220A, 220B, 220C, 220D, 220E in FIG. 1B, among the plurality of network nodes and may be derived for any suitable performance metric P1, P2, P3. In alternative example aspects, multiple node performance assessment thresholds may be derived. By way of example, a node performance assessment threshold may be calculated for a given performance metric for each of the plurality of network nodes 110-162. Alternatively, a node performance assessment threshold may be derived for each of a plurality of performance metrics for one or more network nodes of the plurality of network nodes 110-162.

By way of example, in example aspects in which the plurality of network nodes 110-162 is a plurality of network nodes of a wireless cellular telecommunications network and at least one network node of the plurality of network nodes serves as an integrated access and backhaul, IAB, donor node and the other network nodes of the plurality serve as IAB relay nodes, one or more node performance assessment thresholds may be calculated for the IAB donor node.

The at least one node performance assessment threshold may be derived in any suitable way. By way of example, additional data sets may be obtained and classified by inputting each additional data set to the trained machine-learning algorithm and then analysing the values of the performance metric of the at least one network node and the output classifications in order to identify a value of the performance metric at which the plurality of network nodes has a predetermined likelihood of being classified as normal. For example, a value of the performance metric may be selected as the node performance assessment threshold of the at least one network node for which, data sets in which the performance metric of the at least one network has that value were classified as normal by the machine-learning algorithm with a certain probability (e.g. 50%, 60%, 70%, 80%, 90%, etc.).

By way of alternative, the trained machine-learning algorithm may be deconstructed, that is, processed in order to determine which input variables (that is, performance metrics of a given node) were relevant to the output of the neural network by any suitable means. The input variables most relevant to the classification normal or abnormal (e.g. having at least a certain probability of being relevant) may be determined and values of the performance metric of the at least one KPI which are relevant to such classifications may be identified. Accordingly, a node performance assessment threshold may be determined based on, for example, the values of the performance metric that were considered relevant to their respective data sets being classified as abnormal.

Deconstruction of the trained machine-learning algorithm 23 may be performed by any suitable means, such as, for example, masking one or more of the inputs in turn and identifying which one or more inputs results in the largest variation in the output value, or, in the case where the machine-learning algorithm 23 is a neural network, by using Taylor decomposition on each layer of the neural network or by determining a deconvolution of the machine-learning algorithm 23 in a case where the machine-learning algorithm 23 is a convolutional neural network.

In example aspects in which each data set further comprises respective values of a plurality of performance metrics for each of the plurality of network nodes 110-162 and the method further comprises deriving, for the at least one network node, a respective node performance assessment threshold for at least one of the plurality of performance metrics, any suitable means, such as those discussed above, may be used to derive a node performance assessment threshold for each network node.

In this way, a node performance assessment threshold indicative of a value of the performance metric of the at least one node at which the plurality of network nodes has a predetermined likelihood of being classified as normal may be derived for at least one network node of the plurality of network nodes. This node performance assessment threshold may be used to monitor the performance of the plurality of network nodes based on the value of the performance metric of the at least one node.

Accordingly, during use, the derived node performance assessment threshold may be used to monitor the plurality of network nodes 110-162 and to detect instances in which one or more network nodes have not yet started behaving abnormally but in which the plurality of network nodes does not have a predetermined likelihood of being classified as normal, by comparing the value of the performance metric of the at least one network node to the node performance assessment threshold.

Therefore, action may be taken to alleviate abnormal behaviour, as discussed in more detail below, before one or more network nodes start to behave abnormally or before one or more network nodes behave abnormally for an extended period of time. As such, the apparatus 20 of FIG. 2 reduces or eliminates a situation in which abnormal behaviour of the node may have already negatively affected the movement of traffic through the network or the performance of other nodes and a situation in which the abnormal behaviour of a network node may have already resulted in damage to the hardware of the node by the time an alarm or alert is raised.

Furthermore, by comparing the value of the performance metric of the at least one network node to a node performance assessment threshold which was derived using data from a plurality of nodes, the apparatus of FIG. 2 ensures that performance monitoring reflects how the values of the performance metrics of a node are correlated to the values of the performance metrics of other connected nodes in the network Furthermore, in some example aspects in which each data set further comprises respective values of a plurality of performance metrics for each of the plurality of network nodes 110-162 and the method further comprises deriving, for the at least one network node, a respective node performance assessment threshold for at least one of the plurality of performance metrics, by comparing the value of each performance metric of the at least one network node to a respective node performance assessment threshold which was derived using data related to the plurality of performance metrics, the apparatus of FIG. 2 ensures that performance monitoring reflects how the values of the performance metrics of a node are correlated to each other.

Accordingly, the technical problems discussed above in relation to the background section may be addressed.

In addition, the apparatus 20 may, optionally, provide one or more of the following advantages:
1. It is possible to improve life cycle management (LCM) of network nodes, by better regulating the traffic, processing load and other stresses experienced by the network node. This may, in in turn, help to lower the total cost of ownership (TCO) of the plurality of network nodes.
2. The apparatus 20 may allow a network operator to foresee how resilient a network node (e.g. a radio base station, a site, etc.) is for different impact and performance variety.
3. It may be possible to minimize the number of input and data sets into the machine-learning algorithm 23 by identifying one or more performance metrics which are most essential to the determination of whether the plurality of network nodes 110-162 is operating normally. This may be particularly important in a case where the plurality of network nodes 110-162 comprises a plurality of radio base stations 220A, 220B, 220C, 220D, 220E, such as those shown in FIG. 1B, because a large number of performance counters and KPIs may be determined as performance metrics for each radio base station 200A, 200B, 200C, 200D, 200E. Accordingly, by reducing the performance metrics input to the machine-learning algorithm 23 to those most essential to the determination of whether the plurality of network nodes 110-162 is operating normally, it is possible to improve the efficiency of apparatus 20 relative to conventional performance monitoring apparatuses which rely on machine-learning.
4. The node performance assessment thresholds between similar sites (e.g. network nodes, pluralities of network nodes, etc.) may be readily compared to identify pluralities of network nodes that are particularly vulnerable to abnormal behaviour. this may be achieved, for example, by identifying a plurality of network nodes for which one or more node performance assessment thresholds significantly differ from the corresponding normality thresholds in comparison to other pluralities of network nodes. Accordingly, performance monitoring may be more accurate.
5. In a case where the network may operate on more than one frequency band, such as a case where the plurality of network nodes 110-162 comprises a plurality of radio base stations 220A, 220B, 220C, 220D, 220E, it may be possible for a network operator to foresee indications of a problem with some frequency bands, when traffic or users are adjusted or rotated between the network nodes.

Detailed discussion will now be provided as to how the derived node performance assessment threshold may be used in monitoring the performance of the plurality of network nodes 110-162.

As discussed above, the process 40 of FIG. 4 may be performed by the apparatus 20 of FIG. 2, for example, before a plurality of network nodes 110-162 (e.g. one or more network sites) are handed over to an operator or user (e.g. during an installation and acceptance phase), periodically, whenever equipment on the site detects that there is no traffic (e.g. during night-time), or on request during the site's lifetime. More generally, the process 40 of FIG. 4 may be performed by the apparatus 200 of FIG. 2 which the plurality of network nodes is not in use or are experiencing low use (e.g. little traffic and low processing loads).

Performance monitoring may be carried out by the apparatus 20 of FIG. 2. Alternatively, the apparatus 20 of FIG. 2 may be configured to output the one or more derived node performance assessment thresholds to another network entity, for example, a network operations controller (NOC), which uses the one or more node performance assessment thresholds to monitor performance of the plurality of network nodes. In some example aspects, the apparatus 20 may be provided as part of the NOC, on a remote server or in the cloud.

During use, the plurality of network nodes 110-162 may be monitored, using the one or more derived node performance assessment thresholds in order to detect abnormal behaviour. By way of example, it may be beneficial to monitor the plurality of network nodes 110-162 prior to outputting an instruction to perform transmission to a network node among a plurality of network nodes 110-162. In this way, it may be possibly to anticipate abnormal behaviour and react thereto prior to outputting the instruction to perform transmission, in a case where the probability of the plurality of network nodes being classified as normal is less than the predetermined likelihood.

This approach may be particularly useful in cases where the plurality of network nodes 110-162 comprises a plurality of radio base stations 220A, 220B, 220C, 220D, 220E, such as those shown in FIG. 1B. In particular, mobile communications networks, such as network 200, typically schedule transmissions in predetermined units of time, such as, for example, frames, subframes, slots, etc. Accordingly, it is generally possible to perform performance monitoring processing, such as obtaining a value of a performance metric from a network node and comparing it to a node performance assessment threshold in the time between scheduling the transmission and performing the transmission. Accordingly, it may be possible to alter the routing of traffic through the network and/or configuration of one or more network nodes based on the performance monitoring.

Figure 7:
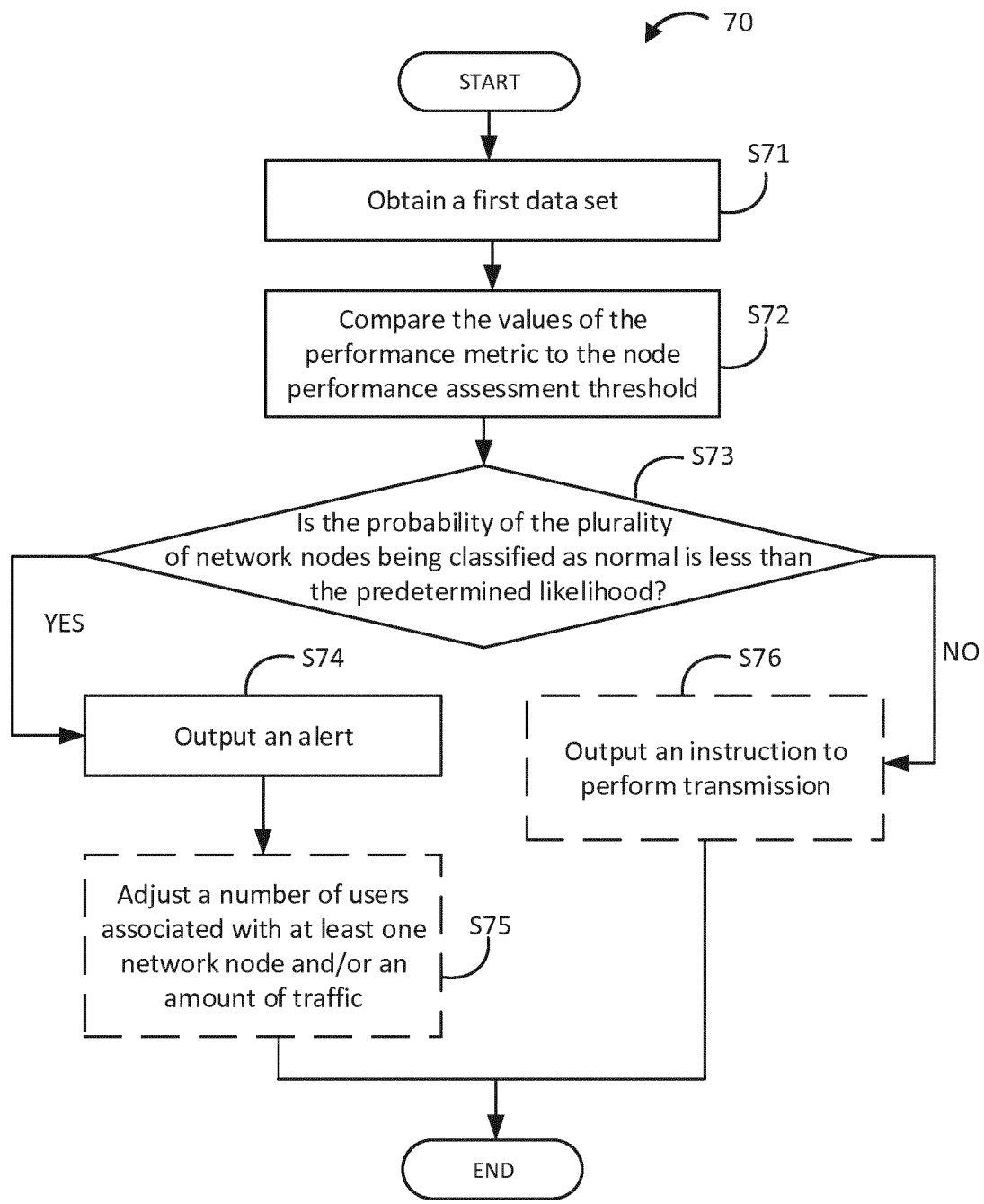
FIG. 7 is a flow diagram illustrating a process by which the apparatus of FIG. 2 may determine whether or not to output an instruction to perform transmission to a network node among a plurality of network nodes, according to a first example aspect herein.

FIG. 7 is a flow diagram illustrating a process 70 by which the apparatus 20 of FIG. 2 may determine whether or not to output an instruction to perform transmission to a network node among a plurality of network nodes 110-162, according to a first example aspect herein. The process 70 of FIG. 7 may alternatively be performed by any network entity, such as a NOC, that performs performance monitoring.

In process step S71 of FIG. 7, the processing module 22 obtains from the at least one network node, prior to outputting an instruction to perform a transmission, a first data set comprising respective values of the performance metric of the at least one network node.

The at least one network nodes and the performance metric are those for which a node performance assessment threshold was derived using the process 40 of FIG. 4.

In process step S72 of FIG. 7, the processing module 22 compares the respective values of the performance metric of the at least one network node to the node performance assessment threshold in order to determine whether the probability of the plurality of network nodes 110-162 being classified as normal is less than the predetermined likelihood.

In process step S73, if the probability of the plurality of network nodes 110-162 being classified as normal is less than the predetermined likelihood, the process 70 proceeds to process step S74. In contrast, if the probability of the plurality of network nodes 110-162 being classified as normal is greater than or equal to the predetermined likelihood, the process 70 proceeds to process step S76. In alternative example aspects, the process 70 may proceed to process step S74 if the probability of the plurality of network nodes 110-162 being classified as normal is less than or equal to the predetermined likelihood, and proceed to process step S76 if the probability of the plurality of network nodes 110-162 being classified as normal is greater than the predetermined likelihood.

In process step S74 of FIG. 7, the processing module 22 outputs an alert.

Outputting an alert, may comprise, for example, outputting an alert to any suitable network entity, such as a NOC, which may react automatically to the alert or to a network operator, network engineer or other user, e.g. via a suitable network entity or to a device (e.g. a mobile phone, laptop, etc.) associated with that user, who may determine how to react to that alert.

In some example aspects, the alert may differ in accordance with the at least network node, the performance metric and/or the plurality of network nodes 110-162 in question in order to provide an indication of the at least network node, the performance metric or the plurality of network nodes 110-162 to the recipient of the alert. This may be particularly useful where the at least one network node comprises two or more network nodes and/or a respective node performance assessment threshold is derived for multiple performance metrics for use in performance monitoring.

The process 70 may optionally include process step S75 (the optional process step being indicated by dashed lines in FIG. 7). In process step S75 of FIG. 7, the processing module 22 adjusts a number of users associated with at least one network node and/or adjusts an amount of traffic routed through the at least one network node in order to avoid or ameliorate abnormal behaviour in the at least one network node.

In some example aspects, the processing module 22 itself may adjust the number of users associated with at least one network node and/or the amount of traffic routed through the at least one network node, by outputting instructions to the at least one network node or by any other suitable means. Alternatively, the processing module 22 may be configured to adjust the number of users associated with at least one network node and/or the amount of traffic routed through the at least one network node by outputting an instruction or a request to any suitable network entity, such as a NOC or to a network operator, network engineer or other user, e.g. via a suitable network entity or to a device (e.g. a mobile phone, laptop, etc.) associated with that user to initiate the adjustment. The instruction or request may be output as part of the alert outputted in process step S74 or may be output separately.

How the number of users associated with at least one network node and/or the amount of traffic routed through the at least one network node is adjusted may depend on the type of network and network node in question and the performance metric. By way of example, if the performance metric is a network traffic congestion related KPI and the network node is a switch, one option is to reroute traffic through another network node. By way of further example, if the network node is a baseband unit (BBU) and the values of one or more performance metrics indicate that the node is close to the limit of maximum number of active mobile subscribers (UEs), a handover process can be triggered by the baseband unit for attaching some of the UEs to a neighboring cell associated with another network node.

The process 70 may optionally include process step S76. In process step S76 of FIG. 7, the processing module 22 outputs an instruction to perform a transmission. The instruction may be output directly to the network node or to a suitable network entity which in turn controls the network node to perform transmission.

Accordingly, the performance monitoring process 70 of FIG. 7 allows it to be ensured that, prior to outputting the instruction to perform transmission, the probability of the plurality of network nodes 110-162 being classified as normal is greater than the predetermined likelihood and, if not, allows the network to react appropriately.

Figure 8:
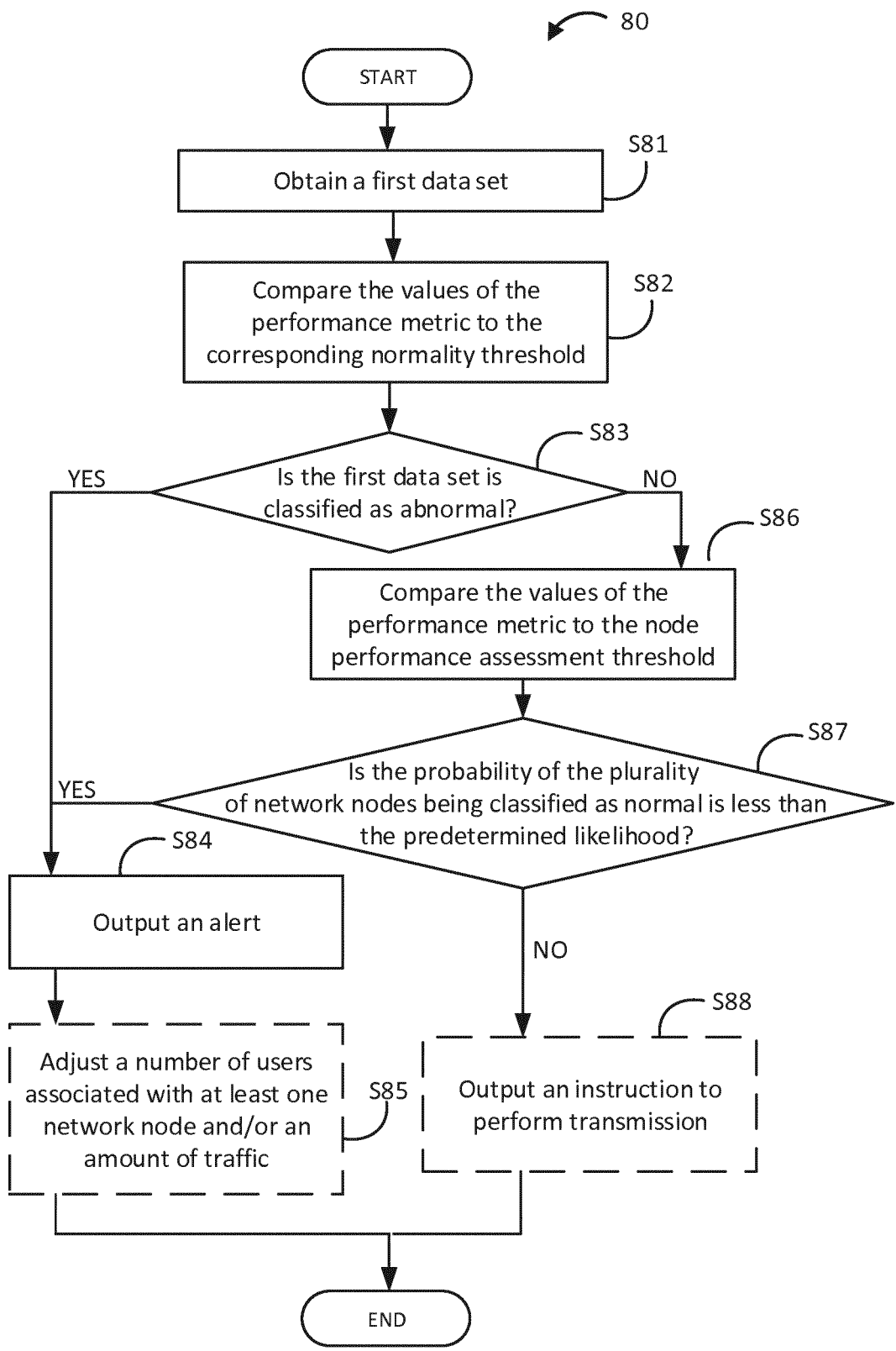
FIG. 8 is a flow diagram illustrating a process by which the apparatus of FIG. 2 may determine whether or not to output an instruction to perform transmission to a network node among a plurality of network nodes, according to a second example aspect herein.

FIG. 8 is a flow diagram illustrating a process 80 by which the apparatus of FIG. 2 may determine whether or not to output an instruction to perform transmission to a network node among a plurality of network nodes 110-162, according to a second example aspect herein. Similar to process 70 of FIG. 7, the process 80 of FIG. 8 may alternatively be performed by any network entity, such as a NOC, that performs performance monitoring.

In process step S81 of FIG. 8, the processing module 22 obtaining from the at least one network node, prior to outputting an instruction to perform a transmission, a first data set comprising respective values of the performance metric of the at least one network node. The at least one network nodes and the performance metric are those for which a node performance assessment threshold was derived using the process 40 of FIG. 4.

In process step S82 of FIG. 8, the processing module 22 compares the respective values of the performance metric of the at least one network node to the corresponding normality threshold in order to classify the first data set as normal or abnormal. Accordingly, it is possible to avoid unnecessarily determining whether the probability of the plurality of network nodes 110-162 being classified as normal is less than the predetermined likelihood in a case where the value of the performance metric in at least one node is already indicative of abnormal behaviour.

In process step S83 of FIG. 8, if the first data set is classified as abnormal based on the comparison of the respective values of the performance metric of the at least one network node to the corresponding normality threshold, the process 80 proceeds to process step S84. However, if the first data set is classified as normal based on the comparison of the respective values of the performance metric of the at least one network node to the corresponding normality threshold, the process 80 proceeds to process step S86.

In process step S84 of FIG. 8, the processing module 22 outputs an alert. This process step corresponds to process step S74 of FIG. 7.

The alert output may vary depending on whether the alert is due to the first data set being classified as abnormal or due to the probability of the plurality of network nodes 110-162 being classified as normal being less than the predetermined likelihood.

The process 80 may optionally include process step S86. In process step S85 of FIG. 8, the processing module 22 adjusts a number of users associated with at least one network node and/or adjusts an amount of traffic routed through the at least one network node. This process step corresponds to process step S75 of FIG. 7.

In process step S86 of FIG. 8, the processing module 22 compares the respective values of the performance metric of the at least one network node to the node performance assessment threshold in order to determine whether the probability of the plurality of network nodes 110-162 being classified as normal is less than the predetermined likelihood.

In process step S87 of FIG. 8, if the probability of the plurality of network nodes 110-162 being classified as normal is less than the predetermined likelihood, the process proceeds to process step S84 (discussed above). In contrast, if the probability of the plurality of network nodes 110-162 being classified as normal is greater than or equal to the predetermined likelihood, the process 80 proceeds to process step S88. In alternative example aspects, the process 80 may proceed to process step S84 if the probability of the plurality of network nodes 110-162 being classified as normal is less than or equal to the predetermined likelihood, and proceed to process step S88 if the probability of the plurality of network nodes 110-162 being classified as normal is greater than the predetermined likelihood.

The process 80 may optionally include process step S88. In process step S88 of FIG. 8, the processing module 22 outputs an instruction to perform a transmission. The instruction may be output directly to the network node or to a suitable network entity which in turn controls the network node to perform transmission.

Accordingly, the performance monitoring process 80 of FIG. 8 allows it to be ensured that, prior to outputting the instruction to perform transmission, the probability of the plurality of network nodes 110-162 being classified as normal is greater than the predetermined likelihood and, if not, allows the network to react appropriately. Furthermore, the performance monitoring process 80 of FIG. 8 makes it possible to avoid unnecessarily determining whether the probability of the plurality of network nodes 110-162 being classified as normal is less than the predetermined likelihood in a case where the value of the performance metric in at least one node is already indicative of abnormal behaviour.

In alternative example aspects, in which the first data set further comprises respective values of a plurality of performance metrics for the at least one network node and a respective node performance assessment threshold is derived for at least one performance metric of the plurality of performance metrics for the at least one network node, the process 70 of FIG. 7 and the process 80 of FIG. 8 may be adapted so that comparing the respective values of the performance metric of the at least one network node to the node performance assessment threshold comprises comparing, for each of the at least one performance metric, the respective values of that performance metric to the corresponding respective node performance assessment threshold.

By way of example, in such example aspects, in process step S73 of FIG. 7, the process 70 may be adapted so that the process S70 proceeds to process step S74 in a case where it is determined that the probability of the plurality of network nodes 110-162 being classified as normal is less than the predetermined likelihood based on any performance metric of the at least one performance metrics. As such, the process 70 of FIG. 7 only proceeds to process step S76 in a case where the probability of the plurality of network nodes 110-162 being classified as normal is greater than or equal to the predetermined likelihood in light of all the at least one performance metrics considered. The process 80 of FIG. 8 may be adapted in a corresponding manner.

Figure 9:
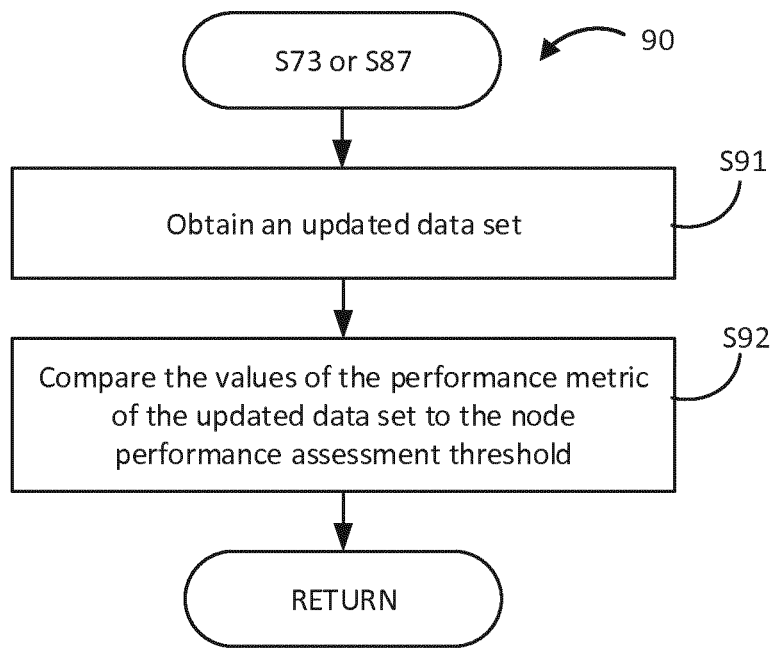
FIG. 9 is a flow diagram illustrating a process by which the apparatus of FIG. 2 may adjust a parameter of at least one network node of the one or more network nodes, according to a second example aspect herein.

Additionally, or alternatively, either of processes 70 of FIG. 7 or 80 of FIG. 8 may be adapted to include process 90 of FIG. 9 after a determination of NO in process step S73 of FIG. 7 or after a determination of NO in process step S87 of FIG. 8, respectively. FIG. 9 is a flow diagram illustrating a process 90 by which the apparatus of FIG. 2 may adjust a parameter of at least one network node of the one or more network nodes 110-162, according to a second example aspect herein.

In process step S91 of FIG. 9, the processing module 22 updates, in the case where the probability of the plurality of network nodes being classified as normal is less than the predetermined likelihood, the respective values of the performance metric of the at least one network node by adjusting a parameter of the at least one network node, the parameter being associated with the performance metric, in order to obtain an updated data set.

In order to determine the parameter to be adjusted, the processing module 22 may process the first data set using the trained machine-learning algorithm 23 in order to determine at least one performance metric to which abnormal operation is attributable and/or at least one node to which abnormal operation is attributable. The adjusted parameter may then be associated with the at least one performance metric to which abnormal operation is attributable and/or be a parameter of the at least one node to which abnormal operation is attributable.

The first data set may be processed using the machine-learning algorithm 23 in this way in cases where the at least one network node, whose performance metric values are included in the first data set, comprises each network node of the plurality of network nodes. That is, the first data set comprises respective values of the performance metric of each of the plurality of network nodes. Furthermore, each dataset of the plurality of data sets used to train the machine learning component that was classified as abnormal should have been further classified according to at least one metric of the plurality of performance metrics to which abnormal operation is attributable and/or according to at least one network node of the plurality of network nodes to which abnormal operation is attributable.

In alternative example aspects, in which a single performance metric is considered, the adjusted parameter may be selected to correspond to that performance metric. Alternatively, in cases where multiple performance metrics are considers, the adjusted parameter may be selected based on a most relevant performance metric (e.g. one which most frequently indicates abnormal behaviour or which is considered most critical). By way of further alternative, multiple parameters corresponding to multiple performance metrics may be adjusted. The selection of a parameter(s) associated with a given performance metric and how such parameters may be adjusted is discussed in more detail above in relation to process step S41 of FIG. 4.

Additionally, or alternatively, in cases where the first data set comprises respective values of the performance metric of two or more network nodes among the plurality of network nodes 110-162, the parameter may be adjusted in all the at least one network nodes or in one node only.

In process step S91 of FIG. 9, the processing module 22 compares the respective values of the performance metric of the at least one network node of the updated data set to the node performance assessment threshold.

The process 90 of FIG. 9 then returns to process step S72 of process 70 of FIG. 7 or to process step S82 of process 80 of FIG. 8.

Accordingly, the process 90 of FIG. 9 may allow for potential abnormal behaviour to be avoided or ameliorated without requiring an alert to be output.

In order to avoid excessive delays, there may be a limit to the number of times the process 90 of FIG. 9 is performed and an updated data set generated without outputting an alert. Alternatively, the process 90 of FIG. 9 may be prevented from being performed in a case where in the case where the probability of the plurality of network nodes being classified as normal is less than the predetermined likelihood by a certain amount (e.g. less than half the predetermined likelihood).

In some example aspects, the processes of any one of FIGS. 4, 7, 8 and 9 may be implemented by a computer program comprising instructions, which, when executed by a computer, cause the computer to perform said process or processes. Such a computer program may be stored on a non-transitory computer-readable storage medium or carried by a signal. By way of alternative, the processes of any one of FIGS. 4, 7, and 9 may be implemented by mobile computing device comprising a processor and a memory, wherein the memory is configured to store instructions which, when executed by the processor, cause the processor to perform said process or processes.

Although detailed embodiments have been described, they only serve to provide a better understanding of the invention defined by the independent claims, and are not to be seen as limiting.

LIST OF ABBREVIATIONS

BBU Base Band Unit
CSI-RS Channel State Information Reference Signal
E-RAB E-UTRAN Radio Access Bearer
GAN Global Area Network
IAB Integrated Access and Backhaul
IoT Interference over Thermal noise
KPI Key Performance Indicator
LTE Long Term Evolution
MAN Metropolitan Area Network
MME Mobility Management Entity
NOC Network Operating Center
OSS Operational Support Systems
PA Power Amplifier
PM Performance Management
PSU Power Supply Unit
RAN Radio Access Network
SBH Self Backhaul
UE User Equipment
WAN Wide Area Network
W-LAN Wireless Local Area Network

The invention claimed is:

1. A computer-implemented method of monitoring the performance of a plurality of network nodes interconnected in a multi-hop arrangement using at least one node performance assessment threshold, the method comprising:

obtaining a plurality of data sets, wherein a data set comprises a respective value of a performance metric for each of the plurality of network nodes;

classifying each of the plurality of data sets as normal or abnormal by comparing the respective values of the performance metric of each of the plurality of network nodes to a corresponding normality threshold, thus providing a plurality of classified data sets;

processing the plurality of classified data sets using a machine-learning algorithm in order to derive, for at least one network node of the plurality of network nodes, a node performance assessment threshold indicative of a value of the performance metric of the at least one node at which the plurality of network nodes has a predetermined likelihood of being classified as normal;

obtaining from the at least one network node, prior to outputting an instruction to perform a transmission, a first data set comprising respective values of the performance metric of the at least one network node;

comparing the respective values of the performance metric of the at least one network node in the first data set to the node performance assessment threshold in order to determine whether a probability of the plurality of network nodes being classified as normal is less than the predetermined likelihood; and in a case where the probability of the plurality of network nodes being classified as normal is less than the predetermined likelihood, outputting an alert.

2. The method of claim 1, wherein:

each data set further comprises respective values of a plurality of performance metrics for each of the plurality of network nodes; and classifying each of the plurality of data sets further comprises comparing each of the values of one or more of the plurality of performance metrics to one or more corresponding normality thresholds, and the method further comprises deriving, for the at least one network node, a respective node performance assessment threshold for at least one of the plurality of performance metrics.

3. The method of claim 2, wherein each of the plurality of data sets classified as abnormal is further classified according to at least one of the plurality of performance metrics to which abnormal operation is attributable.

4. The method of claim 1, wherein:
the first data set further comprises respective values of a plurality of performance metrics for the at least one network node and a respective node performance assessment threshold is derived for at least one performance metric of the plurality of performance metrics for the at least one network node; and
comparing the respective values of the performance metric of the at least one network node to the node performance assessment threshold comprises comparing, for each of the at least one performance metric, the respective values of that performance metric to the corresponding respective node performance assessment threshold.

5. The method of claim 1, wherein:
the at least one network node comprises each network node of the plurality of network nodes; and
each dataset of the plurality of data sets classified as abnormal is further classified according to at least one metric of the plurality of performance metrics to which abnormal operation is attributable and/or according to at least one network node of the plurality of network nodes to which abnormal operation is attributable, and
the method further comprises processing, in the case where the probability of the plurality of network nodes being classified as normal is less than the predetermined likelihood, the first data set using the trained machine learning algorithm in order to determine at least one performance metric to which abnormal operation is attributable and/or at least one node to which abnormal operation is attributable.

6. The method of claim 1, wherein:
the plurality of network nodes is a plurality of network nodes of a wireless cellular telecommunications network; and
at least one network node of the plurality of network nodes serves as an integrated access and backhaul (IAB) donor node and the other network nodes of the plurality serve as IAB relay nodes.

7. A non-transitory computer-readable storage medium storing a computer program comprising instructions, which, when executed by a computer, cause the computer to monitor the performance of a plurality of network nodes interconnected in a multi- hop arrangement using at least one node performance assessment threshold, the instructions causing the computer to:
obtain a plurality of data sets, wherein a data set comprises a respective value of a performance metric for each of the plurality of network nodes;
classify each of the plurality of data sets as normal or abnormal by comparing the respective values of the performance metric of each of the plurality of network nodes to a corresponding normality threshold, thus providing a plurality of classified data sets;
process the plurality of classified data sets using a machine-learning algorithm in order to derive, for at least one network node of the plurality of network nodes, a node performance assessment threshold indicative of a value of the performance metric of the at least one node at which the plurality of network nodes has a predetermined likelihood of being classified as normal;
obtain from the at least one network node, prior to outputting an instruction to perform a transmission, a first data set comprising respective values of the performance metric of the at least one network node;
compare the respective values of the performance metric of the at least one network node in the first data set to the node performance assessment threshold in order to determine whether a probability of the plurality of network nodes being classified as normal is less than the predetermined likelihood; and
in a case where the probability of the plurality of network nodes being classified as normal is less than the predetermined likelihood, output an alert.

8. An apparatus for monitoring the performance of a plurality of network nodes interconnected in a multi-hop arrangement using at least one node performance assessment threshold, the apparatus comprising
processing circuitry and a memory containing instructions executable by the processing circuitry, whereby the apparatus is configured to:
obtain a plurality of data sets, wherein a data set comprises a respective value of a performance metric for each of the plurality of network nodes;
classify each of the plurality of data sets as normal or abnormal by comparing the respective values of the performance metric of each of the plurality of network nodes to a corresponding normality threshold, thus providing a plurality of classified data sets;
process the plurality of classified data sets using a machine-learning algorithm in order to derive, for at least one network node of the plurality of network nodes, a node performance assessment threshold indicative of a value of the performance metric of the at least one node at which the plurality of network nodes has a predetermined likelihood of being classified as normal;
obtain from the at least one network node, prior to outputting an instruction to perform a transmission, a first data set comprising respective values of the performance metric of the at least one network node;
compare the respective values of the performance metric of the at least one network node in the first data set to the node performance assessment threshold in order to determine whether a probability of the plurality of network nodes being classified as normal is less than the predetermined likelihood; and
in a case where the probability of the plurality of network nodes being classified as normal is less than the predetermined likelihood, output an alert.

9. The apparatus of claim 8, wherein:
each data set further comprises respective values of a plurality of performance metrics for each of the plurality of network nodes; and
the processing circuitry and the memory containing instructions executable by the processing circuitry whereby the apparatus is configured to:
classify each of the plurality of data sets further by comparing each of the values of one or more of the plurality of performance metrics to one or more corresponding normality thresholds, and
derive, for the at least one network node, a respective node performance assessment threshold for at least one of the plurality of performance metrics.

10. The apparatus of claim 9, the processing circuitry and the memory containing instructions executable by the processing circuitry whereby the apparatus is configured such that each of the plurality of data sets classified as abnormal is further classified according to at least one of the plurality of performance metrics to which abnormal operation is attributable.

11. The apparatus of claim 9, wherein the plurality of performance metrics comprises a plurality of counters and a plurality of Key Performance Indicators (KPIs), the respective values of the plurality of KPIs being based on the respective values of the plurality of counters.

12. The apparatus of claim 8, the processing circuitry and the memory containing instructions executable by the processing circuitry whereby the apparatus is configured such that each of the plurality of data sets classified as abnormal is further classified according to at least one network node of the plurality of network nodes to which abnormal operation is attributable.

13. The apparatus of claim 8, the processing circuitry and the memory containing instructions executable by the processing circuitry whereby the apparatus is configured to output to the at least one network node, in a case where the probability of the plurality of network nodes being classified as normal is greater than or equal to the predetermined likelihood, an instruction to perform a transmission.

14. The apparatus of claim 8, the processing circuitry and the memory containing instructions executable by the processing circuitry whereby the apparatus is configured to:
compare the respective values of the performance metric of the at least one network node to the corresponding normality threshold, prior to comparing the respective values to the node performance assessment threshold, in order to classify the first data set as normal or abnormal; and
in a case where the first data set is classified as abnormal, output an alert to a network operator.

15. The apparatus of claim 8, the processing circuitry and the memory containing instructions executable by the processing circuitry whereby the apparatus is configured to, in a case where an alert is output, adjust a number of users associated with at least one network node and/or adjust an amount of traffic routed through the at least one network node.

16. The apparatus of claim 8, the processing circuitry and the memory containing instructions executable by the processing circuitry whereby the apparatus is configured to:
in the case where the probability of the plurality of network nodes being classified as normal is less than the predetermined likelihood, update the respective values of the performance metric of the at least one network node by adjusting a parameter of the at least one network node, the parameter being associated with the performance metric, in order to obtain an updated data set; and
compare the respective values of the performance metric of the at least one network node of the updated data set to the node performance assessment threshold.

17. The apparatus of claim 8, wherein:
the first data set further comprises respective values of a plurality of performance metrics for the at least one network node; and
the processing circuitry and the memory containing instructions executable by the processing circuitry whereby the apparatus is configured to:
derive a respective node performance assessment threshold for at least one performance metric of the plurality of performance metrics for the at least one network node; and
compare the respective values of the performance metric of the at least one network node to the node performance assessment threshold comprises comparing, for each of the at least one performance metric, the respective values of that performance metric to the corresponding respective node performance assessment threshold.

18. The apparatus of claim 8, wherein:
the at least one network node comprises each network node of the plurality of network nodes; and
each dataset of the plurality of data sets classified as abnormal is further classified according to at least one metric of the plurality of performance metrics to which abnormal operation is attributable and/or according to at least one network node of the plurality of network nodes to which abnormal operation is attributable, and
the processing circuitry and the memory contain instructions executable by the processing circuitry whereby the apparatus is configured to process, in the case where the probability of the plurality of network nodes being classified as normal is less than the predetermined likelihood, the first data set using the trained machine learning algorithm in order to determine at least one performance metric to which abnormal operation is attributable and/or at least one node to which abnormal operation is attributable.

19. The apparatus of claim 8, wherein:
the plurality of network nodes is a plurality of network nodes of a wireless cellular telecommunications network; and
at least one network node of the plurality of network nodes serves as an integrated access and backhaul (IAB) donor node and the other network nodes of the plurality serve as IAB relay nodes.

* * * * *